United States Patent
Han et al.

(10) Patent No.: US 7,495,377 B2
(45) Date of Patent: Feb. 24, 2009

(54) FIELD EMISSION DISPLAY (FED) AND METHOD OF MANUFACTURE THEREOF

(75) Inventors: In-Taek Han, Seoul (KR); Tae-Sik Oh, Suwon-si (KR); Ha-Jin Kim, Suwon-si (KR); Andrei Zoulkarneev, Suwon-si (KR); Jong-Min Kim, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 671 days.

(21) Appl. No.: 11/131,222

(22) Filed: May 18, 2005

(65) Prior Publication Data

US 2005/0258729 A1     Nov. 24, 2005

(30) Foreign Application Priority Data

May 22, 2004   (KR) ...................... 10-2004-0036670

(51) Int. Cl.
  *H01J 1/02*   (2006.01)
(52) U.S. Cl. ....................................... 313/309; 313/495
(58) Field of Classification Search ................. 313/495, 313/309, 310, 336, 351
  See application file for complete search history.

(56) References Cited

U.S. PATENT DOCUMENTS 5,793,153 A  *  8/1998  Itoh et al. .................... 313/306
5,886,460 A  *  3/1999  Jones et al. .................. 313/310

* cited by examiner

*Primary Examiner*—Vip Patel
(74) *Attorney, Agent, or Firm*—Robert E. Bushnell, Esq.

(57) ABSTRACT

A Field Emission Display (FED) and a method of manufacturing the FED are provided. The FED includes a substrate; a plurality of under-gate electrodes formed parallel to one another on a top surface of a substrate; a plurality of cathode electrodes formed perpendicular to the under-gate electrodes on an upper portion of the under-gate electrode, each of cathode holes being formed in portions of the cathode electrodes that intersect with the under-gate electrodes; a plurality of emitters formed symmetrical with respect to centers of the cathode holes on the cathode electrodes; and a plurality of gate electrodes formed to be electrically connected to the under-gate electrodes in central portions of the cathode holes.

27 Claims, 26 Drawing Sheets

FIELD EMISSION DISPLAY (FED) AND METHOD OF MANUFACTURE THEREOF

CLAIM OF PRIORITY

This application makes reference to, incorporates the same herein, and claims all benefits accruing under 35 U.S.C. §119 from an application for FIELD EMISSION DISPLAY AND METHOD OF MANUFACTURING THE SAME earlier filed in the Korean Intellectual Property Office on May 22, 2004 and thereby duly assigned Serial No. 10-2004-0036670.

BACKGROUND OF THE INVENTION

1. Field of the Invention

The present invention relates to a Field Emission Display (FED) and a method of manufacture thereof, and more particularly, to an FED in which the focusing effect of electron beams can be improved and a driving voltage can be reduced, and a method of manufacturing the FED.

2. Description of the Related Art

A display, which is an important part of a conventional information transmission medium, includes a PC monitor and a television (TV). The display can be a Cathode Ray Tube (CRT) using high-speed thermal electron emission and a flat panel display that has been recently developed. The flat panel display includes a Liquid Crystal Display (LCD), a Plasma Display Panel (PDP), and a Field Emission Display (FED).

The Field Emission Display (FED) supplies a strong electric field between an emitter disposed on a cathode electrode and a gate electrode, thereby emitting electrons from the emitter, the electrons colliding with a fluorescent material on an anode layer, and emitting light. Since the FED is a thin display having an entire thickness of several centimeters and has the advantages of a wide viewing angle, low power, and low cost, the FED is considered to be a next generation display with LCDs and PDPs.

The FED uses a physical principle similar to that of the CRT. That is, if electrons emitted from a cathode electrode are accelerated and collide with an anode electrode, a fluorescent layer coated on the anode electrode is excited so that light having a predetermined color is emitted. However, the emitter of the FED is formed of a cold cathode material, unlike in the CRT.

A structure of an FED includes a lower substrate and an upper substrate, which are separated from each other. The lower substrate and the upper substrate are maintained at a predetermined distance by a spacer placed therebetween. A cathode electrode is formed on a top surface of the lower substrate, and an insulating layer and a gate electrode for electron extraction are sequentially stacked on the cathode electrode. A cavity through which a portion of the cathode electrode is exposed is formed on the insulating layer, and an emitter is formed in the cavity. An anode electrode is formed on a bottom surface of the upper substrate, and a fluorescent layer is coated on the anode electrode.

In the FED having the above structure, when trajectories of electron beams are not correctly controlled, a desired color cannot be correctly represented in a desired pixel. Thus, the trajectories of the electron beams need to be controlled so that electrons emitted from an emitter are correctly transferred to a desired position of the anode electrode on which the fluorescent layer is coated.

SUMMARY OF THE INVENTION

The present invention provides a field emission display (FED) in which the structure of an emitter is improved to improve the focusing effect of electron beams and to reduce a driving voltage, and a method of manufacturing the same.

According to one aspect of the present invention, a Field Emission Display (FED) is provided comprising: a substrate; a plurality of under-gate electrodes arranged parallel to one another on a top surface of the substrate; a plurality of cathode electrodes arranged perpendicular to the under-gate electrodes on an upper portion of the under-gate electrodes, the plurality of cathode electrodes having cathode holes arranged in portions of the cathode electrodes that intersect with the under-gate electrodes; a plurality of emitters arranged symmetrically with respect to centers of the cathode holes on the cathode electrodes; and a plurality of gate electrodes electrically connected to the under-gate electrodes in central portions of the cathode holes.

The emitters preferably comprise a ring shape along peripheries of the cathode holes.

The emitters preferably comprise at least one material selected from the group consisting of Carbon Nano-Tubes (CNTs), amorphous carbon, nano-diamonds, nano-metallic lines, and nano-oxidation metallic lines.

The FED preferably further comprises: a first insulating layer arranged between the under-gate electrodes and the cathode electrodes: and first cavities arranged in the first insulating layer and communicating with the cathode holes.

The FED preferably further comprises: a second insulating layer arranged on top surfaces of the cathode electrodes; and second cavities arranged in the second insulating layer and communicating with the cathode holes.

The FED preferably further comprises a focusing electrode arranged on a top surface of the second insulating layer.

The gate electrodes preferably protrude from bottom central portions of the first cavities.

The FED preferably further comprises protrusions of an insulating material arranged in the gate electrodes.

A top portion of each of the gate electrodes is preferably at the same height as the height of the cathode electrodes.

A top portion of each of the gate electrodes is preferably at a height between that of the cathode electrodes and that of the focusing electrode.

The FED preferably further comprises a mask layer for backward exposure arranged on top surfaces of the under-gate electrodes.

The mask layer for backward exposure preferably comprises an amorphous silicon or a metallic thin film.

The under-gate electrodes preferably comprise transparent electrodes.

According to another aspect of the present invention, a Field Emission Display (FED) is provided comprising: a substrate; a plurality of under-gate electrodes arranged parallel to one another on a top surface of the substrate; a plurality of cathode electrodes arranged perpendicular to the under-gate electrodes on an upper portion of the under-gate electrodes, the plurality of cathode electrodes having cathode holes arranged in portions of the cathode electrodes that intersect with the under-gate electrodes; and a plurality of emitters arranged symmetrically with respect to centers of the cathode holes on the cathode electrodes.

The emitters preferably comprise a ring shape along peripheries of the cathode holes.

The emitters preferably comprise at least one material selected from the group consisting of Carbon Nano-Tubes (CNTs), amorphous carbon, nano-diamonds, nano-metallic lines, and nano-oxidation metallic lines.

The FED preferably further comprises: a first insulating layer arranged between the under-gate electrodes and the cathode electrodes; and first cavities communicating with the cathode holes and arranged in the first insulating layer.

The FED preferably further comprises: a second insulating layer arranged on top surfaces of the cathode electrodes; and second cavities communicating with the cathode holes and arranged in the second insulating layer.

The FED preferably further comprises a focusing electrode arranged on a top surface of the second insulating layer.

The FED preferably further comprises a mask layer for backward exposure arranged on top surfaces of the under-gate electrodes.

The mask layer for backward exposure preferably comprises amorphous silicon or a metallic thin film.

The under-gate electrodes preferably comprise transparent electrodes.

According to still another aspect of the present invention, a Field Emission Display (FED) is provided comprising: a lower substrate and an upper substrate arranged opposite to each other at a distance; a plurality of under-gate electrodes arranged parallel to one another on a top surface of the lower substrate; a plurality of cathode electrodes arranged perpendicular to the under-gate electrodes on an upper portion of the under-gate electrodes, the plurality of cathode electrodes having cathode holes arranged in portions of the cathode electrodes that intersect with the under-gate electrodes; an electron emission source having a plurality of emitters arranged symmetrically with respect to centers of the cathode holes on the cathode electrodes; an anode cathode arranged on a bottom surface of the upper substrate; and a fluorescent layer arranged on a bottom surface of the anode electrode; wherein the electron emission source includes a plurality of emitter arrays, each emitter array including at least one emitter and corresponding to each of sub-pixels of a pixel; and wherein adjacent emitter arrays cross one another.

The fluorescent layer preferably comprises a plurality of sub-pixel areas corresponding to the emitter arrays and wherein the adjacent sub-pixel areas cross one another.

The emitters preferably comprise a ring shape along peripheries of the cathode holes.

The FED preferably further comprises a focusing electrode arranged on the cathode electrodes.

The FED preferably further comprises a plurality of gate electrodes electrically connected to the under-gate electrodes, the plurality of gate electrodes being arranged in central portions of the cathode holes.

According to yet another aspect of the present invention, a method of manufacturing a Field Emission Display (FED) is provided, the method comprising: forming a plurality of under-gate electrodes parallel to one another on a top surface of a substrate; forming a first insulating layer, having first cavities through which a portion of the under-gate electrodes is exposed, on the top surface of the substrate; forming a plurality of cathode electrodes, having cathode holes communicating with the first cavities, perpendicular to the under-gate electrodes on a top surface of the first insulating layer; forming a second insulating layer, having second cavities communicating with the cathode holes, on top surfaces of the cathode electrodes; forming a focusing electrode on a top surface of the second insulating layer; forming a plurality of gate electrodes protruding from bottom central portions of the first cavities; and forming a plurality of emitters symmetrical with centers of the gate electrodes on the cathode electrodes.

Forming the under-gate electrodes preferably comprises forming transparent electrodes.

Forming the gate electrodes preferably comprises: forming protrusions protruding from the bottom central portions of the first cavities; and forming the gate electrodes on external surfaces of the protrusions.

The protrusions and the second insulating layer are preferably simultaneously formed.

The gate electrodes and the focusing electrode are preferably simultaneously formed.

Forming the emitters preferably comprises: forming a mask layer for backward exposure on top surfaces of the under-gate electrode before forming the first insulating layer, the mask layer patterned in a shape corresponding to the emitters; coating an electron emission material on the cathode electrodes exposed through the second cavities; and patterning the electron emission material with a backward exposure photolithography process using the mask layer for backward exposure as a photo-mask to form the emitters.

Forming the mask layer for backward exposure preferably comprises forming a layer of amorphous silicon or a metallic thin film.

The emitters are preferably formed to have a ring shape along peripheries of the cathode holes.

The emitters are preferably formed of at least one material selected from the group consisting of Carbon Nano-Tubes (CNTs), amorphous carbon, nano-diamonds, nano-metallic lines, and nano-oxidation metallic lines.

According to a further aspect of the present invention, a method of manufacturing a Field Emission Display (FED) is provided, the method comprising: forming a plurality of under-gate electrodes parallel to one another on a top surface of a substrate; forming a first insulating layer, first cavities through which a portion of the under-gate electrodes is exposed, on the top surface of the substrate; forming a plurality of cathode electrodes, having cathode holes communicating with the first cavities, perpendicular to the under-gate electrodes on a top surface of the first insulating layer; forming a plurality of gate electrodes protruding from bottom central portions of the first cavities; forming a second insulating layer, having second cavities communicating with the cathode holes, on top surfaces of the cathode electrodes; forming a focusing electrode on a top surface of the second insulating layer; and forming a plurality of emitters symmetrical with centers of the gate electrodes on the cathode electrodes.

Forming the gate electrodes preferably comprises: forming protrusions protruding from the bottom central portions of the first cavities; and forming the gate electrodes on external surfaces of the protrusions.

The protrusions and the first insulating layer are preferably simultaneously formed.

The gate electrodes and the cathode electrodes are preferably simultaneously formed.

Forming the emitters preferably comprises: forming a mask layer for backward exposure on top surfaces of the under-gate electrode before forming the first insulating layer, the mask layer patterned in a shape corresponding to the emitters; coating an electron emission material on the cathode electrodes exposed through the second cavities; and patterning the electron emission material with a backward exposure photolithography process using the mask layer for backward exposure as a photo-mask to form the emitters.

Forming the mask layer for backward exposure preferably comprises forming a layer of amorphous silicon or a metallic thin film.

The emitters are preferably formed to have a ring shape along peripheries of the cathode holes.

According to yet a further aspect of the present invention, a method of manufacturing a Field Emission Display (FED) is provided, the method comprising: forming a plurality of under-gate electrodes parallel to one another on a top surface of a substrate; forming a first insulating layer, first cavities through which a portion of the under-gate electrodes is exposed, on the top surface of the substrate; forming a plurality of cathode electrodes, having cathode holes communicating with the first cavities, perpendicular to the under-gate electrodes on a top surface of the first insulating layer; forming a second insulating layer, having second cavities communicating with the cathode holes, on top surfaces of the cathode electrodes; forming a focusing electrode on a top surface of the second insulating layer; and forming a plurality of emitters symmetrical with centers of the gate electrodes on the cathode electrodes.

Forming the emitters preferably comprises: forming a mask layer for backward exposure on top surfaces of the under-gate electrode before forming the first insulating layer, the mask layer patterned in a shape corresponding to the emitters; coating an electron emission material on the cathode electrodes exposed through the second cavities; and patterning the electron emission material with a backward exposure photolithography process using the mask layer for backward exposure as a photo-mask to form the emitters.

Forming the mask layer for backward exposure preferably comprises forming a layer of amorphous silicon or a metallic thin film.

The emitters are preferably formed to have a ring shape along peripheries of the cathode holes.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate same or similar components, wherein.

DETAILED DESCRIPTION OF THE INVENTION

Figure 1:
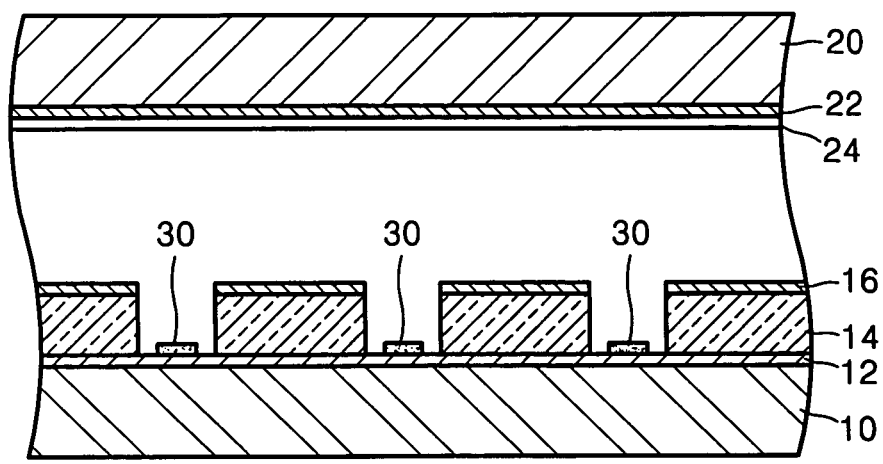
FIG. 1 is a cross-sectional view of a Field Emission Display (FED)

A structure of an FED is shown in FIG. 1. The FED of FIG. 1 includes a lower substrate 10 and an upper substrate 20, which are separated from each other. The lower substrate 10 and the upper substrate 20 are maintained at a predetermined distance by a spacer (not shown) placed therebetween. A cathode electrode 12 is formed on a top surface of the lower substrate 10, and an insulating layer 14 and a gate electrode 16 for electron extraction are sequentially stacked on the cathode electrode 12. A cavity through which a portion of the cathode electrode 12 is exposed is formed on the insulating layer 14, and an emitter 30 is formed in the cavity. An anode electrode 22 is formed on a bottom surface of the upper substrate 20, and a fluorescent layer 24 is coated on the anode electrode 22.

In the FED having the above structure, when trajectories of electron beams are not correctly controlled, a desired color cannot be correctly represented in a desired pixel. Thus, the trajectories of the electron beams need to be controlled so that electrons emitted from an emitter 30 are correctly transferred to a desired position of the anode electrode 22 on which the fluorescent layer 24 is coated.

Hereinafter, exemplary embodiments of an FED and a method of manufacturing the FED according to the present invention will be described in detail with reference to the accompanying drawings. Like reference numerals refer to like elements throughout the drawings.

Figure 2:
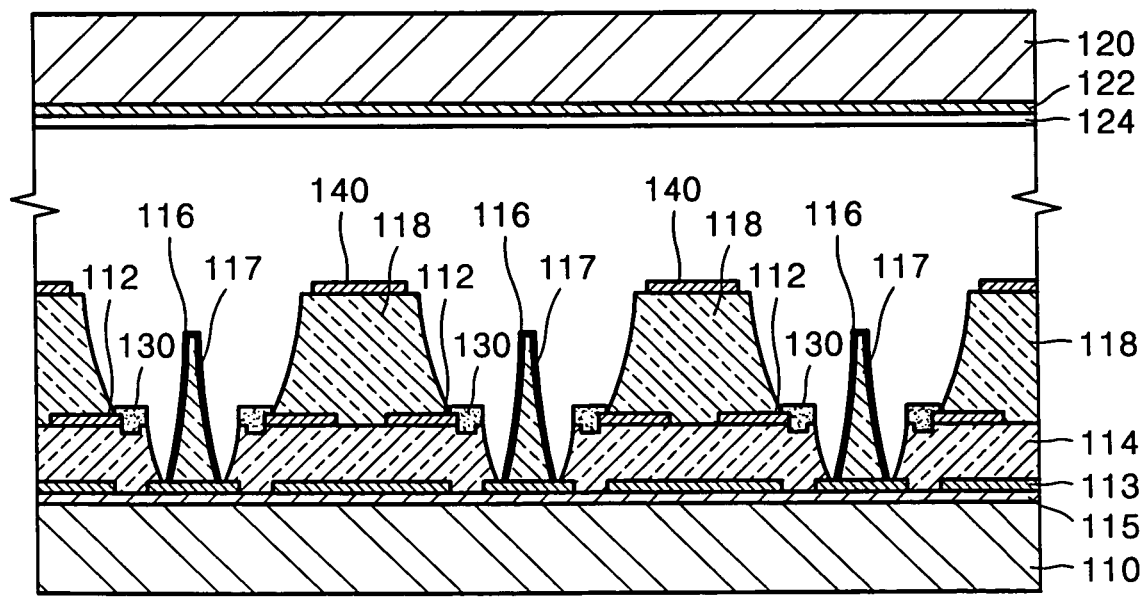
FIG. 2 is a cross-sectional view of a portion of an FED according to an embodiment of the present invention.
Figure 3:
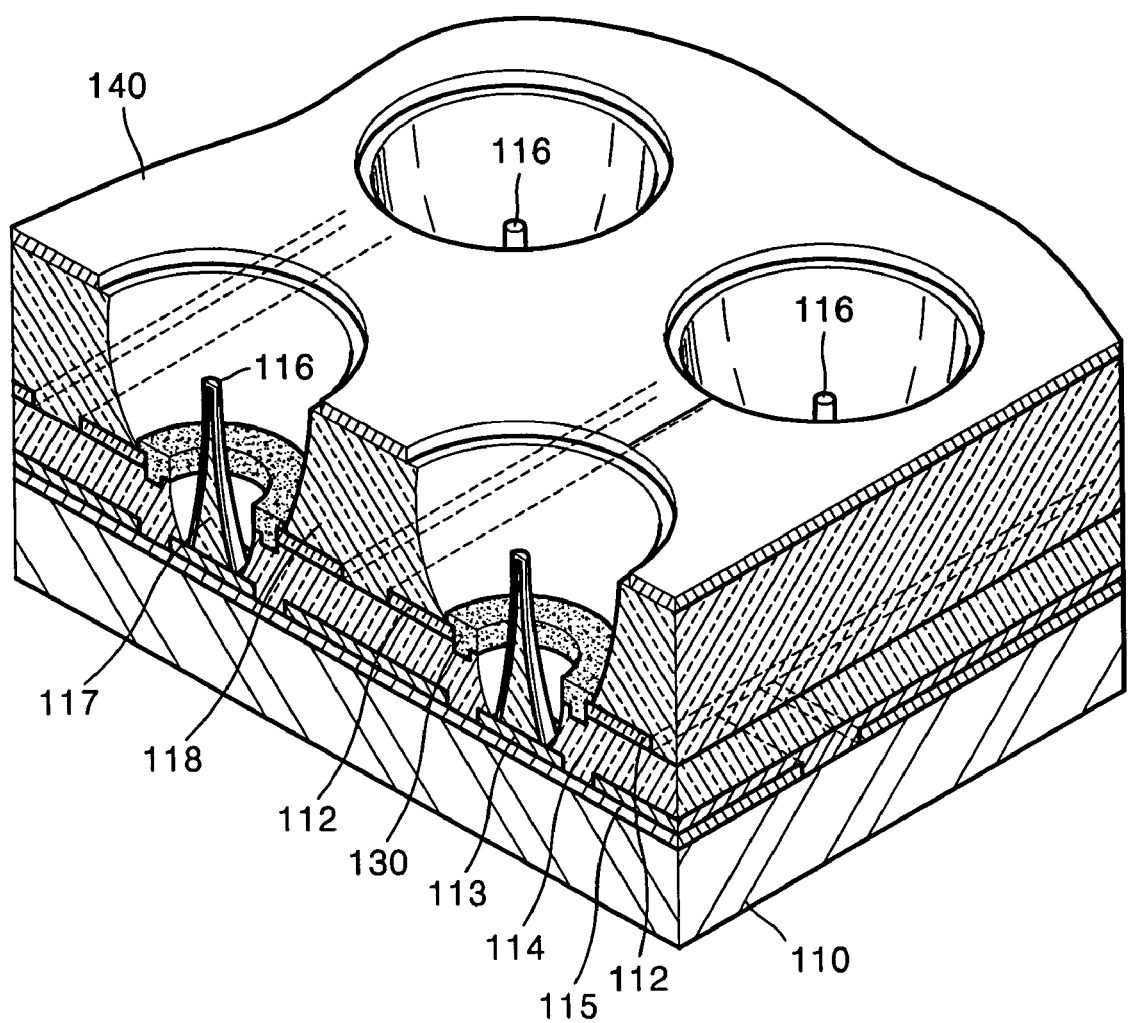
FIG. 3 is a perspective view of a cut important portion of the FED of FIG. 2.
Figure 4:
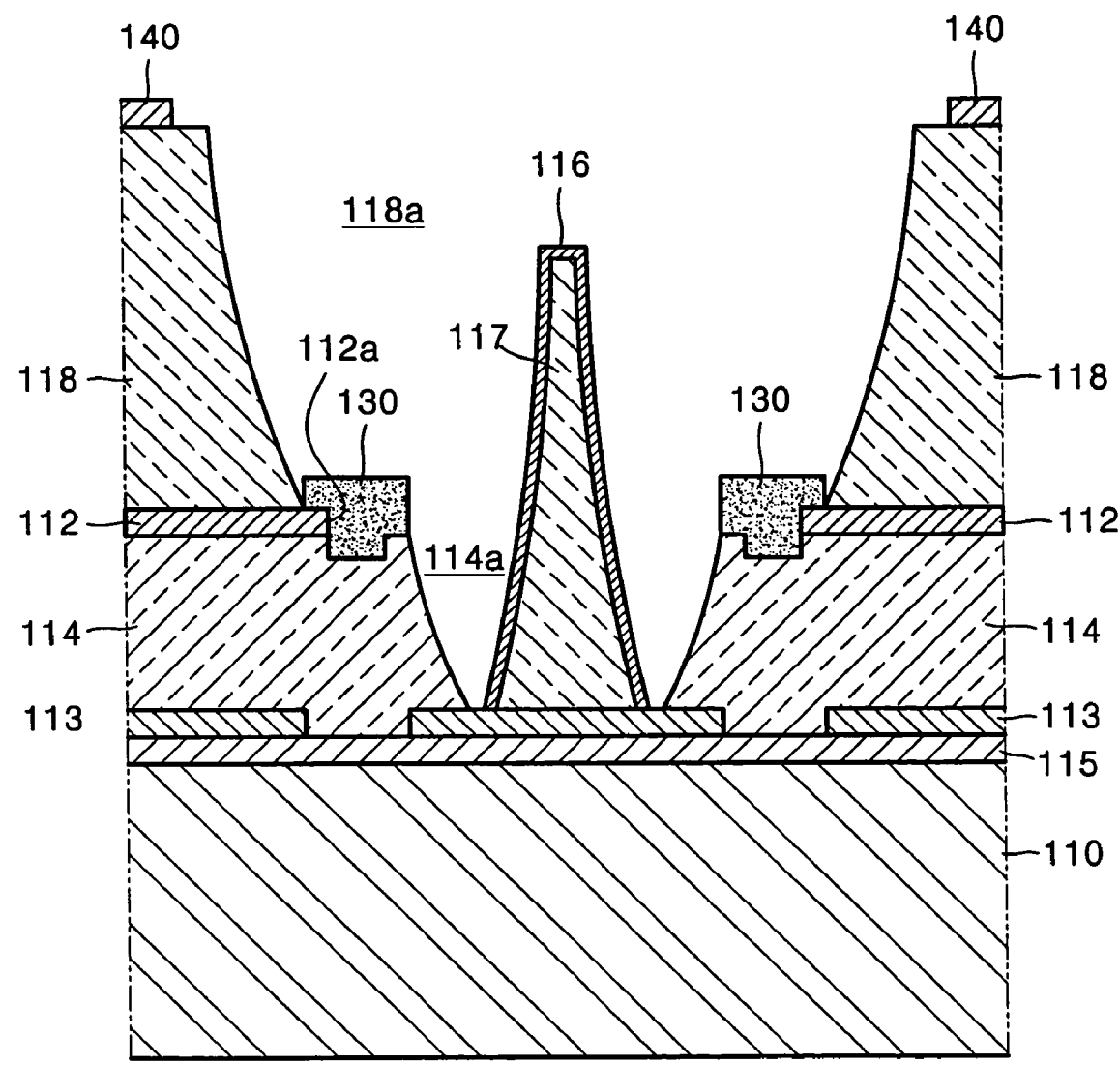
FIG. 4 is a cross-sectional view of the structure of the FED of FIG. 2.

FIG. 2 is a cross-sectional view of a portion of an FED according to an embodiment of the present invention, FIG. 3 is a perspective view of a cut important portion of the FED of FIG. 2, and FIG. 4 is a cross-sectional view of the structure of the FED of FIG. 2.

Referring to FIGS. 2 through 4, the FED includes a lower substrate 110 and an upper substrate 120, which are opposite to each other. A distance between the lower substrate 110 and the upper substrate 120 is maintained by a spacer (not shown) placed therebetween. A glass substrate is generally used as the lower substrate 110 and the upper substrate 120.

A plurality of under-gate electrodes 115 are formed parallel to one another in a striped form on the top surface of the lower substrate 110. The under-gate electrodes 115 are formed of Indium Tin Oxide (ITO) which is a transparent conductive material. A mask layer 113 for backward exposure patterned in a predetermined shape is formed on top surfaces of the under-gate electrodes 115. The mask layer 113 for backward exposure is formed of amorphous silicon (a-Si) or a metallic thin film so that the under-gate electrodes 115 and gate electrodes 116 are electrically connected to one another. The mask layer 113 for backward exposure serves as a photomask for forming emitters 130 through a photolithography process using backward exposure and a resistive layer in a method of manufacturing the FED that will be described later.

A first insulating layer 114 is formed on the top surface of the mask layer 113 for backward exposure to a predetermined thickness. First cavities 114a through which the mask layer 113 for backward exposure is exposed are formed in the first insulating layer 114.

A plurality of cathode electrodes 112 are formed perpendicular to the under-gate electrodes 115 on the top surface of the first insulating layer 114. The cathode electrodes 112 can be formed of a conductive metallic material or ITO which is a transparent conductive material. Each of cathode holes 112a is formed in each of the cathode electrodes 112 that intersect with the under-gate electrodes 115. Each of the cathode holes 112a has a circular cross-section and communicates with each of the first cavities 114a.

A plurality of emitters 130 are formed on the cathode electrodes 112 in the vicinity of the cathode holes 112a. Each emitter 130 is symmetrical with respect to the center of each cathode hole 112a. Each emitter 130 can have a ring shape along the inside of each cathode hole 112a, as shown in FIG. 3. When each emitter 130 is symmetrical with respect to the center of each cathode hole 112a, the area of electron emission by the emitters 130 is increased. In the present embodiment, the emitters 130 can have a variety of shapes in which each emitter 130 is symmetrical with respect to the center of each cathode hole 112a. The emitters 130 can be formed of a material by which electrons are easily emitted. Thus, the emitters 130 can be formed of at least one material selected from the group consisting of Carbon Nano-Tubes (CNTs), amorphous carbon, nano-diamonds, nano-metallic lines, and nano-oxidation metallic lines.

A second insulating layer 118 is formed on top surfaces of the cathode electrodes 112a to a predetermined thickness. Second cavities 118a which communicate with the cathode holes 112a are formed in the second insulating layer 118.

A focusing electrode 140 is formed on the top surface of the second insulating layer 118. The focusing electrode 140 controls the trajectories of electron beams emitted from the emitters 130. The focusing electrode 140 can be formed of a conductive metallic material or ITO which is a transparent conductive material.

The gate electrodes 116 are formed in central portions of the cathode holes 112a. That is, each of the gate electrodes 116 is formed in a space formed by each of the first cavities 114a, the cathode hole 112a, and the second cavity 118a. The gate electrodes 116 protrude from bottom central portions of the first cavities 114a, and protrusions 117 formed of an insulating material are formed in the gate electrodes 116. The gate electrodes 116 can be formed as one body and protrude from the bottom central portions of the first cavities 114a. The gate electrodes 116 are formed so that the top portion thereof is at a height between the cathode electrode 112 and the focusing electrode 140. In this case, the protrusions 117 can be formed at the same height as the thickness of the second insulating layer 118. The gate electrodes 116 can be formed of a conductive metallic material or ITO which is a transparent conductive material, as in the focusing electrode 140.

An anode electrode 122 is formed on the bottom surface of the upper substrate 120, and fluorescent layers 124, in which Red (R), Green (G), and Blue (B) fluorescent materials are sequentially arranged, are formed on the bottom surface of the anode electrode 122. The anode electrode 122 can be formed of ITO which is a transparent conductive material, so that visible light emitted from the fluorescent layers 124 is transmitted therethrough. A black matrix can be formed on the bottom surface of the upper substrate 120 and between the fluorescent layers 124 for contrast improvement.

A structure of the FED according to the present embodiment in which the emitters 130 are arranged is described below with reference to FIGS. 5 and 6.

Figure 5:
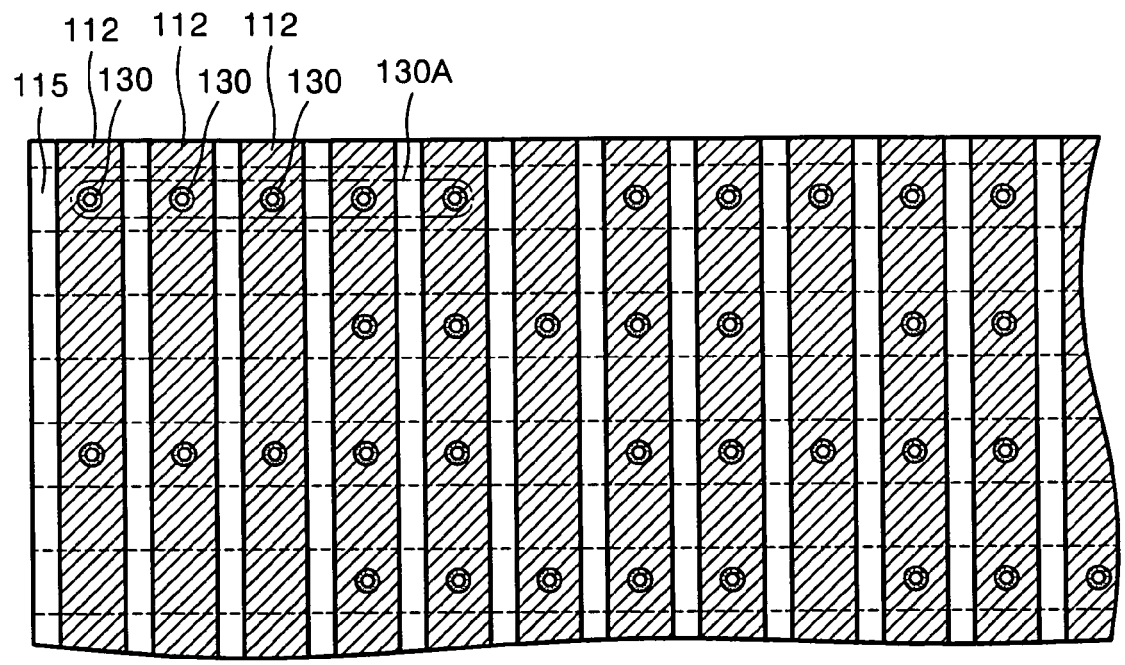
FIG. 5 is a plane view of an example of the arrangement of emitter arrays in the FED according to the embodiment of the present invention.

First, referring to FIG. 5, five emitters 130 are arranged in a line and constitute one emitter array 130A. Emitter arrays 130A constitute an electron emission source. Each of the emitter arrays 130A corresponds to each of sub-pixels which are elements of one pixel in the FED. The adjacent emitter arrays 130A cross one another, as shown in FIG. 5. Although one emitter array 130A is formed of five emitters 130 that are arranged in a line as shown in FIG. 5, six or more emitters 130 or five or less emitters 130 that are arranged in a line can constitute one emitter array 130A.

Figure 6:
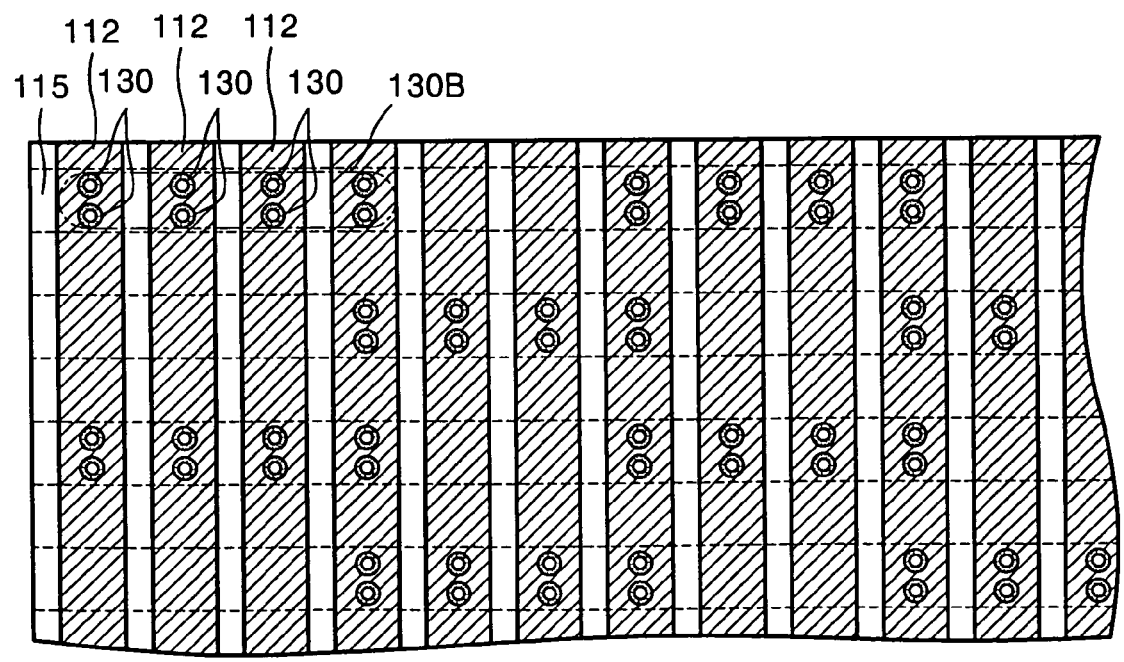
FIG. 6 is a plane view of another example of the arrangement of emitter arrays in the FED according to the embodiment of the present invention.

The emitters 130 can have the structure of FIG. 6. Referring to FIG. 6, eight emitters 130 that are arranged in two lines constitute one emitter array 130B. As described above, the adjacent emitter arrays 130B cross one another. The number of emitters 130 of the emitter arrays 130B can be different from the number of the emitters 130 of FIG. 6.

Figure 7:
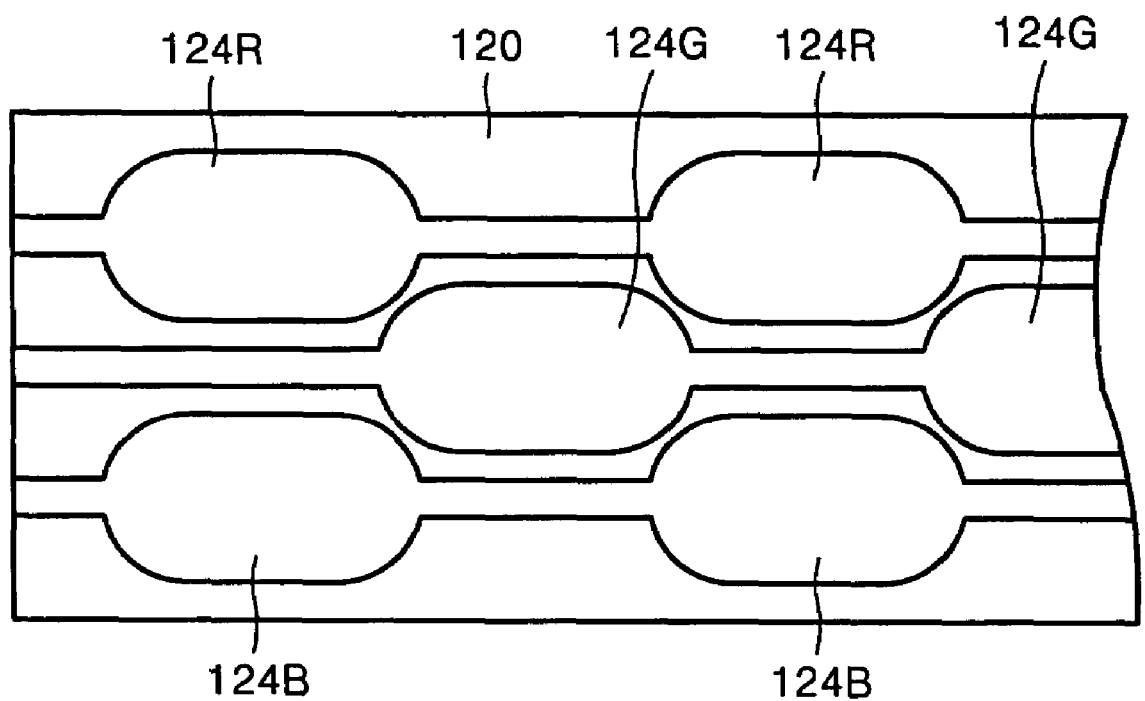
FIG. 7 is a plane view of an example of the arrangement of sub-pixel areas of a fluorescent layer in the FED according to the embodiment of the present invention.
Figure 8A:
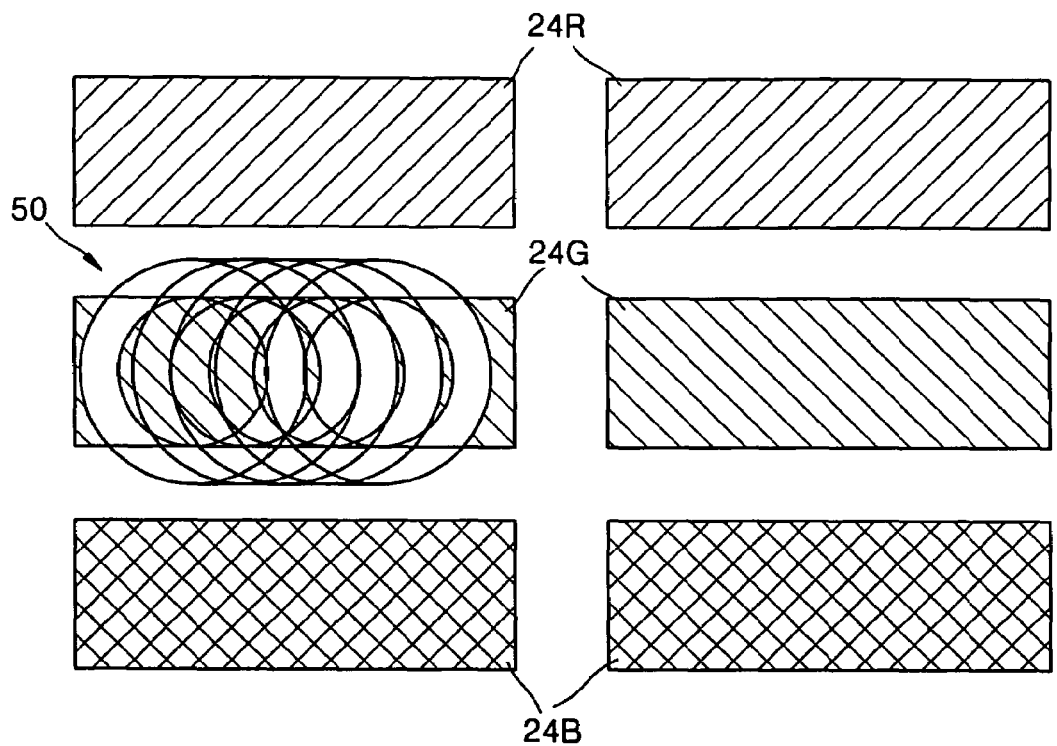
FIGS. 8A and 8B are views of areas in which the electron beams emitted from the emitter arrays of FIGS. 5 and 6 reach sub-pixel areas formed on a fluorescent layer.
Figure 8B:
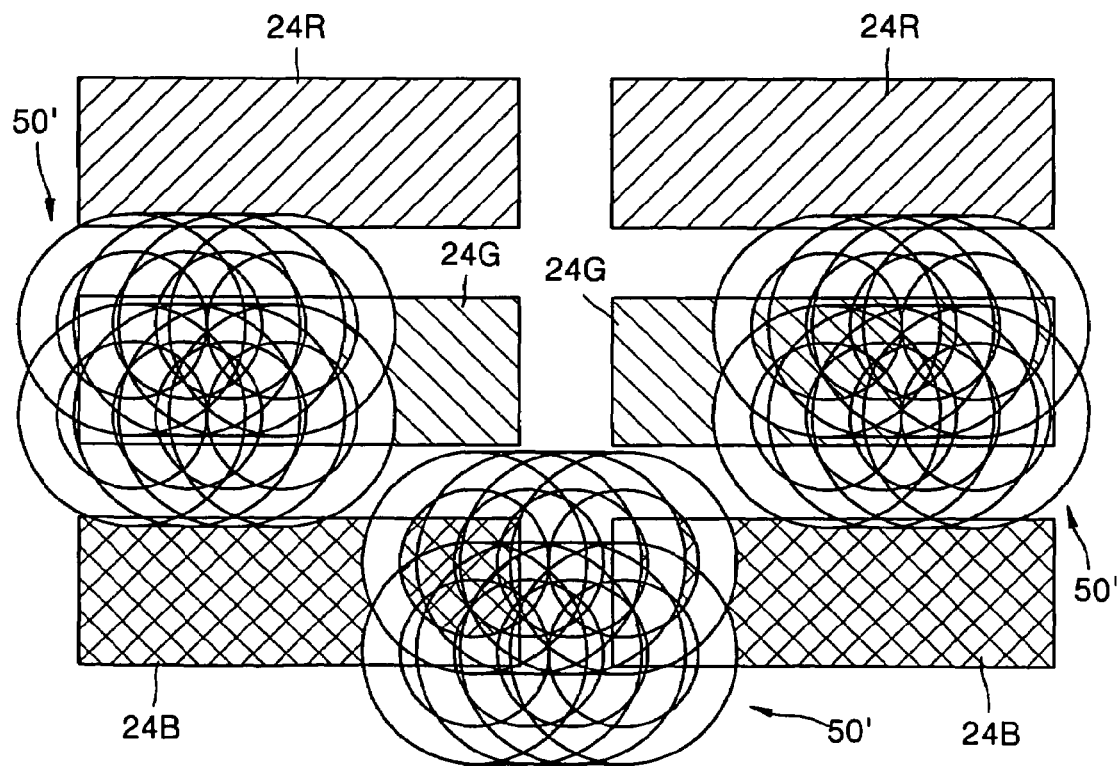

As the emitter arrays 130A and 130B are arranged on the lower substrate 110 to have the above structure, sub-pixel areas 124R, 124G, and 124B of a fluorescent layer formed on the upper substrate 120 are arranged to have the structure of FIG. 7. Referring to FIG. 7, each of the sub-pixel areas 124R, 124G, and 124B corresponds to each of the emitter arrays 130A and 130B. In this case, the adjacent sub-pixel areas 124R, 124G, and 124B cross one another. Each of the sub-pixel areas 124R, 124G, and 124B is formed to include all of areas in which electron beams emitted from the emitter arrays 130A and 130B reach the sub-pixel areas 124R, 124G, and 124B. FIGS. 8A and 8B illustrate areas 50 and 50' in which the electron beams emitted from the emitter arrays 130A and 130B of FIGS. 5 and 6 reach sub-pixel areas 24R, 24G, and 24B formed on a fluorescent layer. Referring to FIGS. 8A and 8B, a portion of the electron beams emitted from the emitter arrays 130A and 130B reaches beyond the sub-pixel areas 24R, 24G, and 24B. Thus, when the sub-pixel areas 124R, 124G, and 124B of the fluorescent layer are arranged as shown in FIG. 7, electron beams emitted from the emitter arrays 130A and 130B can reach all of the sub-pixel areas 124R, 124G, and 124B without losses.

The operation of the FED having the above structure is as follows. First, a predetermined voltage is supplied to the cathode electrode 112 and the gate electrode 116. In this case, a voltage is supplied to the gate electrode 116 via the under-gate electrode 115. Specifically, when a negative voltage is supplied to the cathode electrode 112 and a positive voltage is supplied to the gate electrode 116, electrons start to be emitted from the emitter 130 formed on the cathode electrode 112. The emitted electrons causes the fluorescent layers 124 coated on the anode electrode 122 to which the positive voltage is supplied to excite and emit visible light. The trajectories of the electrons emitted from the emitter 130 are controlled by the focusing electrode 140 to which a predetermined voltage is supplied so that the electrons reach desired positions of the fluorescent layers 124.

Figure 9:
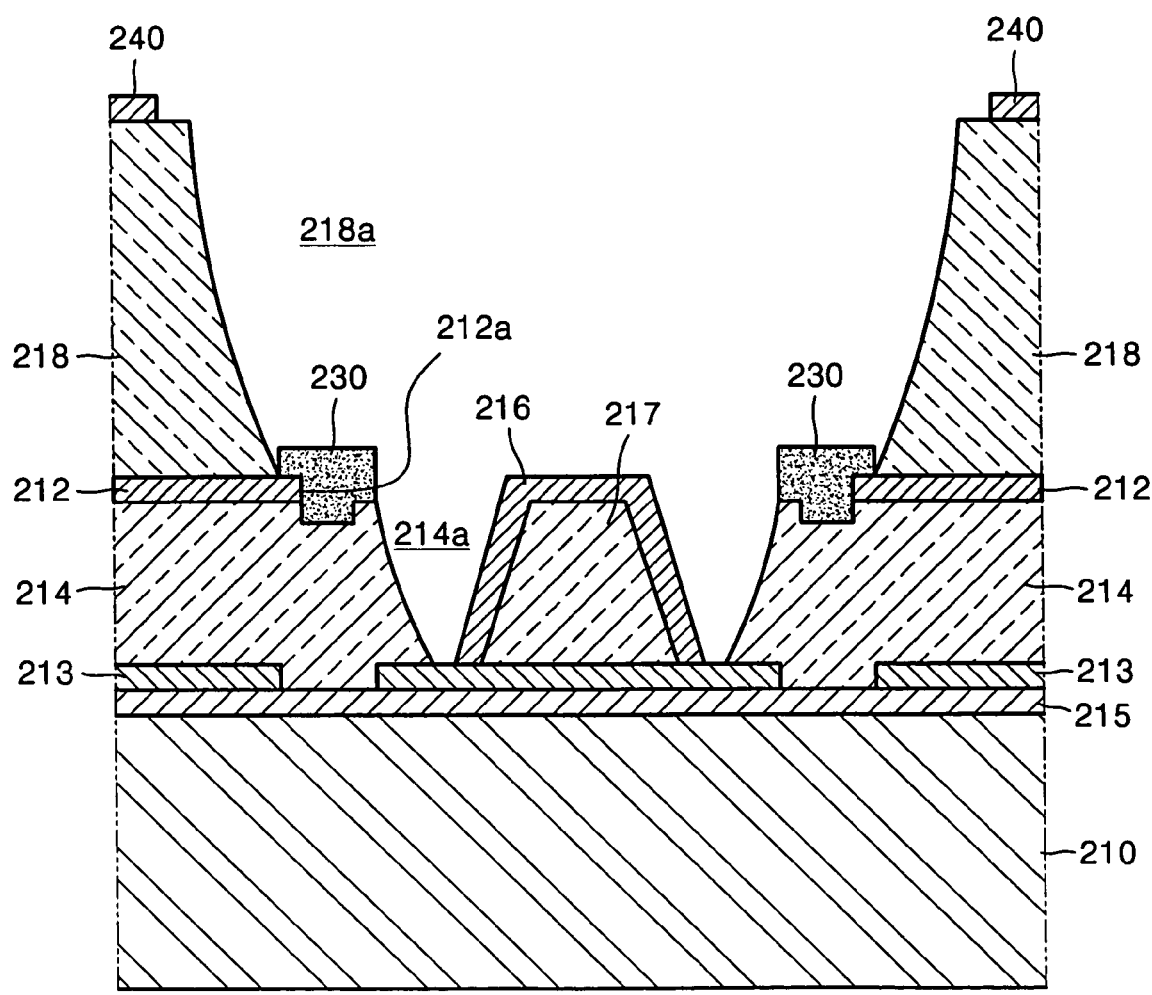
FIG. 9 is a cross-sectional view of a portion of a FED according to another embodiment of the present invention.

FIG. 9 is a cross-sectional view of a portion of an FED according to another embodiment of the present invention. Differences between the above-described embodiment and the present embodiment are as follows.

A plurality of under-gate electrodes 215 are formed parallel to one another on the top surface of a lower substrate 210, and a mask layer 213 for backward exposure is formed on top surfaces of the under-gate electrodes 215. A first insulating layer 214, having first cavities 214a through which a portion of the mask layer 213 for backward exposure is exposed, is formed on the top surface of the mask layer 213 for backward exposure.

A plurality of cathode electrodes 212 are formed perpendicular to the under-gate electrodes 215 on the top surface of the first insulating layer 214. Cathode holes 212a are formed in the cathode electrodes 212 that intersect with the under-gate electrodes 215. The cathode holes 212a communicate with the first cavities 214a.

A plurality of emitters 230 are formed on the cathode electrodes 212 in the vicinity of the cathode holes 212a. Each emitter 230 has a ring shape along the inside of each cathode hole 212a. The emitters 230 can be formed of at least one material selected from the group consisting of Carbon Nano-Tubes (CNTs), amorphous carbon, nano-diamonds, nano-metallic lines, and nano-oxidation metallic lines.

A second insulating layer 218, having second cavities 218a communicating with the cathode holes 212a, is formed on top surfaces of the cathode electrodes 212. A focusing electrode 240 is formed on the top surface of the second insulating layer 218.

Gate electrodes 216 are formed in central portions of the cathode holes 212a. The gate electrodes 216 protrude from bottom central portions of the first cavities 214a, and protrusions 217 of an insulating material are formed in the gate electrodes 216. The gate electrodes 216 are formed so that the top portion thereof is placed at the same height as the height of the cathode electrode 212. As such, the protrusions 217 are formed at the same height as the thickness of the first insulating layer 214. The gate electrodes 216 can be formed of a conductive metallic material or ITO which is a transparent conductive material, as in the cathode electrodes 212. The gate electrode 216 can be formed as one body and protrude from the bottom central portions of the first cavities 214a.

Figure 10:
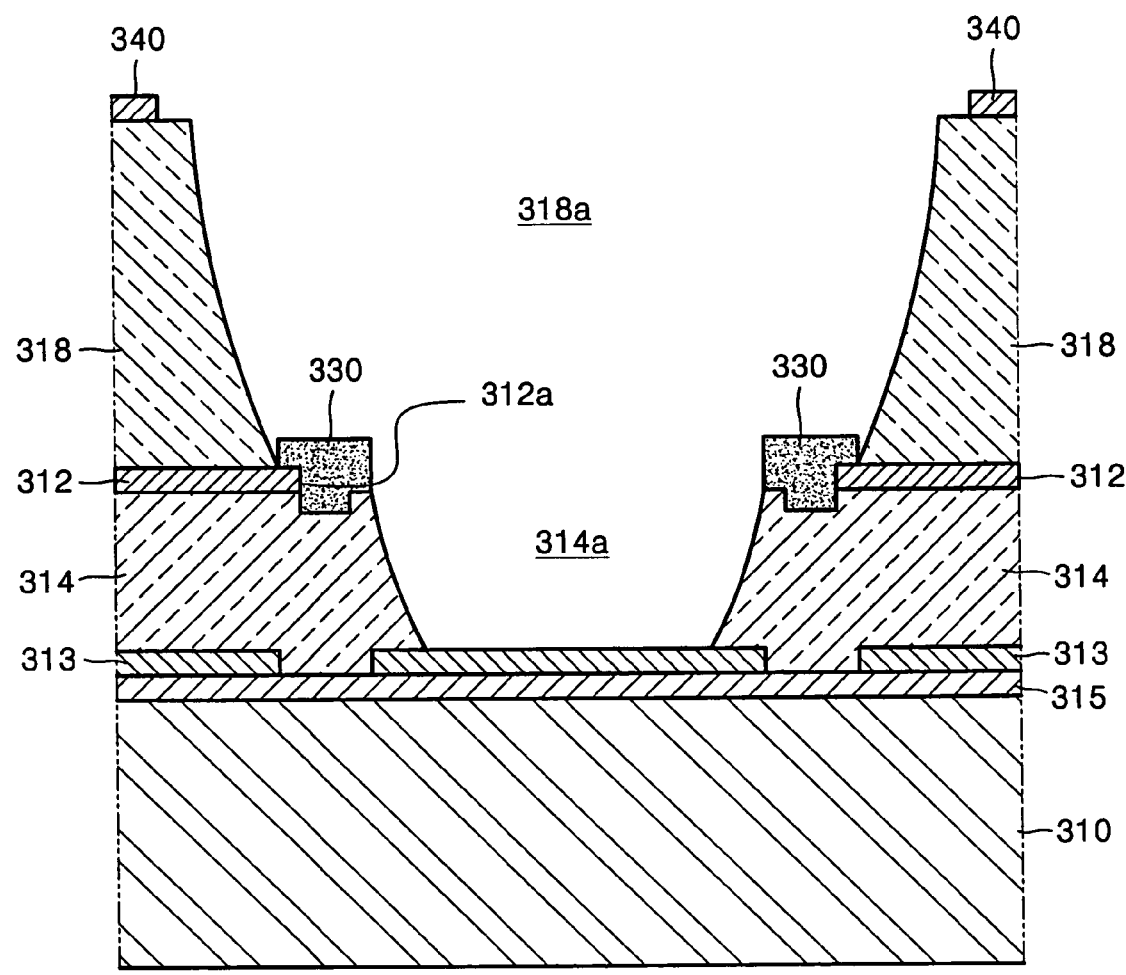
FIG. 10 is a cross-sectional view of a portion of a FED according to still another embodiment of the present invention.

FIG. 10 is a cross-sectional view of a portion of an FED according to still another embodiment of the present invention. Differences between the above-described embodiments and the present embodiment are as follows.

A plurality of under-gate electrodes 315 are formed parallel to one another on the top surface of a lower substrate 310, and a mask layer 313 for backward exposure is formed on top surfaces of the under-gate electrodes 315. A first insulating layer 314, having first cavities 314a through which a portion of the mask layer 313 for backward exposure is exposed, is formed on the top surface of the mask layer 313 for backward exposure.

A plurality of cathode electrodes 312 are formed perpendicular to the under-gate electrodes 315 on the top surface of the first insulating layer 314. Cathode holes 312a are formed in the cathode electrodes 312 that intersect with the under-gate electrodes 315. The cathode holes 312a communicate with the first cavities 314a.

A plurality of emitters 330 are formed on the cathode electrodes 312 in the vicinity of the cathode holes 312a. Each emitter 330 has a ring shape along the inside of each cathode hole 312a.

A second insulating layer 318, having second cavities 318a communicating with the cathode holes 312a, is formed on top surfaces of the cathode electrodes 312. A focusing electrode 340 is formed on the top surface of the second insulating layer 318.

In the FED having the above structure, the under-gate electrodes 315 have the same roles as those of the gate electrodes 116 and 216 in the above-described embodiments. That is, when a predetermined voltage is supplied to each of the cathode electrodes 312 and the under-gate electrodes 315, electrons are emitted from the emitters 330 formed on the cathode electrodes 312.

The result of a simulation performed on electron beam emission in the FED according to the present invention is described below with reference to FIGS. 11A through 11C and FIGS. 12A through 12C.

Figure 11A:
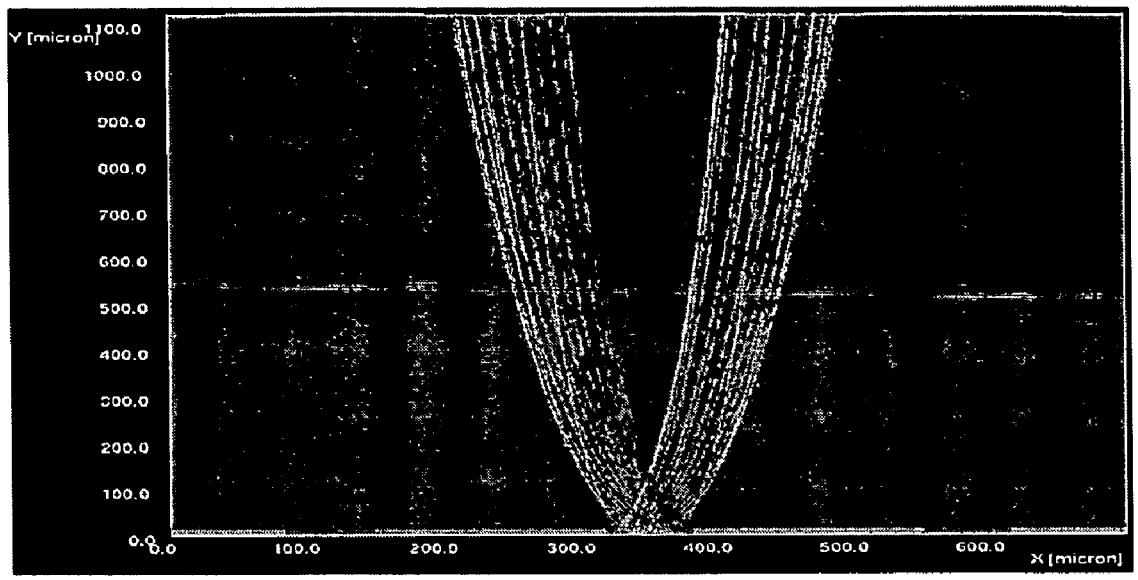
FIGS. 11A through 11C are views of the result of a simulation performed on electron beam emission in the FED of FIG. 9.
Figure 11B:
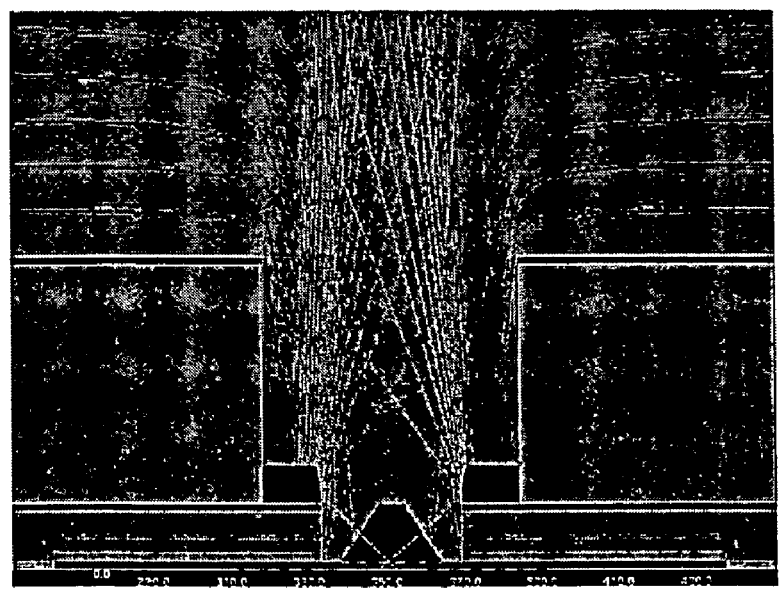
Figure 11C:
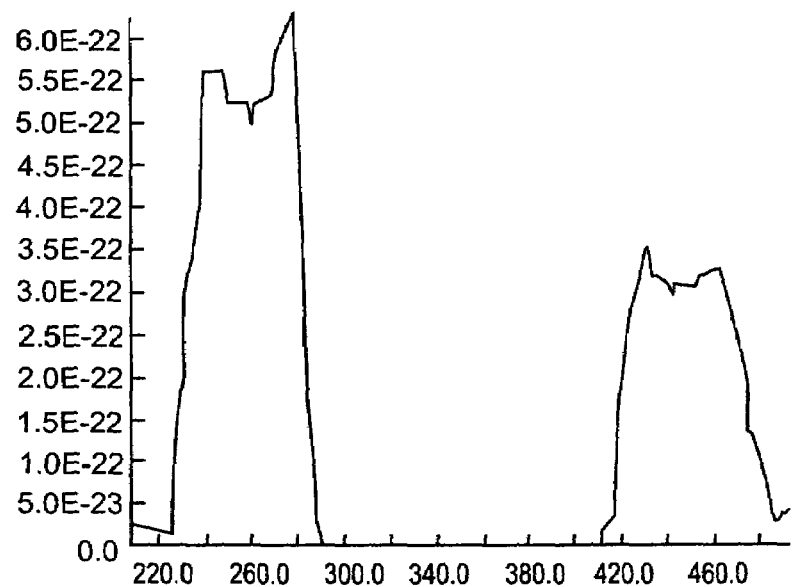

FIGS. 11A through 11C are views of the result of a simulation performed on electron beam emission in the FED of FIG. 9. This simulation is performed under the following conditions. A voltage of 3000V is supplied to an anode electrode, a voltage of 0V is supplied to a gate electrode, a voltage of −20V is supplied to a cathode electrode, and a voltage of −20V is supplied to a focusing electrode so that brightness is about 300 cd/m2 which is an appropriate value. Specifically, FIG. 11A illustrates the trajectories of electron beams emitted from an emitter, FIG. 11B is an expanded view of the peripheries of the emitter, and FIG. 11C illustrates current density.

Referring to FIGS. 11A through 11C, it has been found that the width of electron beams that reach a fluorescent layer is about 200-300 μm and the focusing effect of the electron beams is improved. Thus, the FED according to the present invention can achieve resolution appropriate for a picture quality of a 32" HD TV. In addition, even when a voltage of −20V is supplied to the cathode electrode, the FED can be driven. Thus, it has also been found that the FED can be driven at a driving voltage lower than a prior-art driving voltage.

Figure 12A:
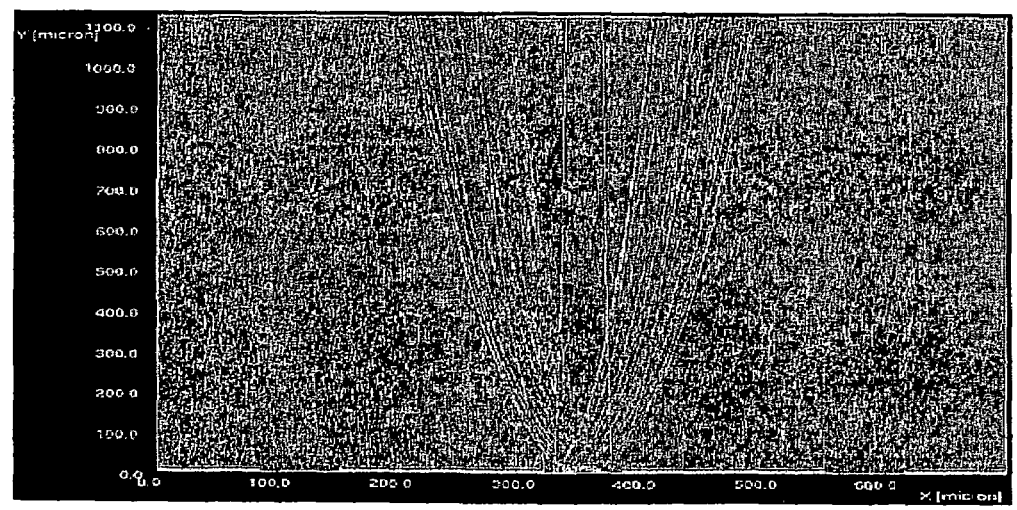
FIGS. 12A through 12C are views of the result of a simulation performed on electron beam emission in the FED of FIG. 10.
Figure 12B:
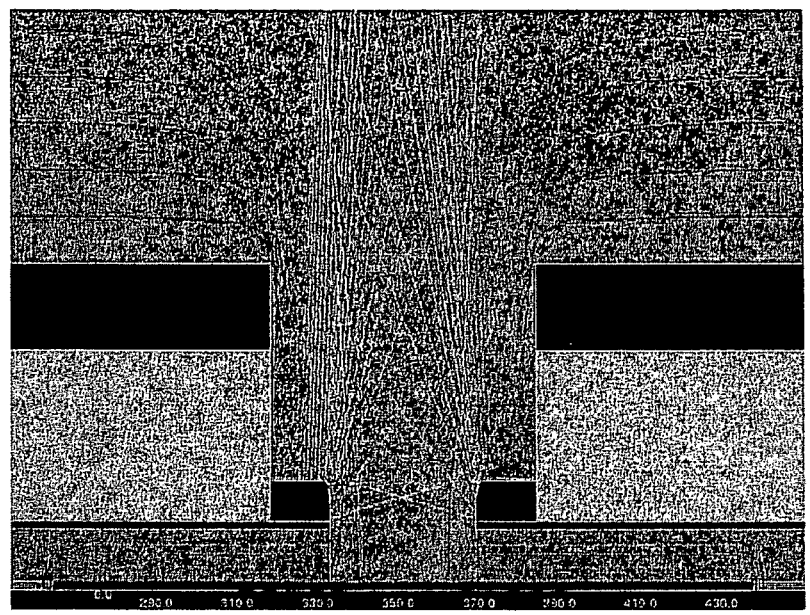
Figure 12C:
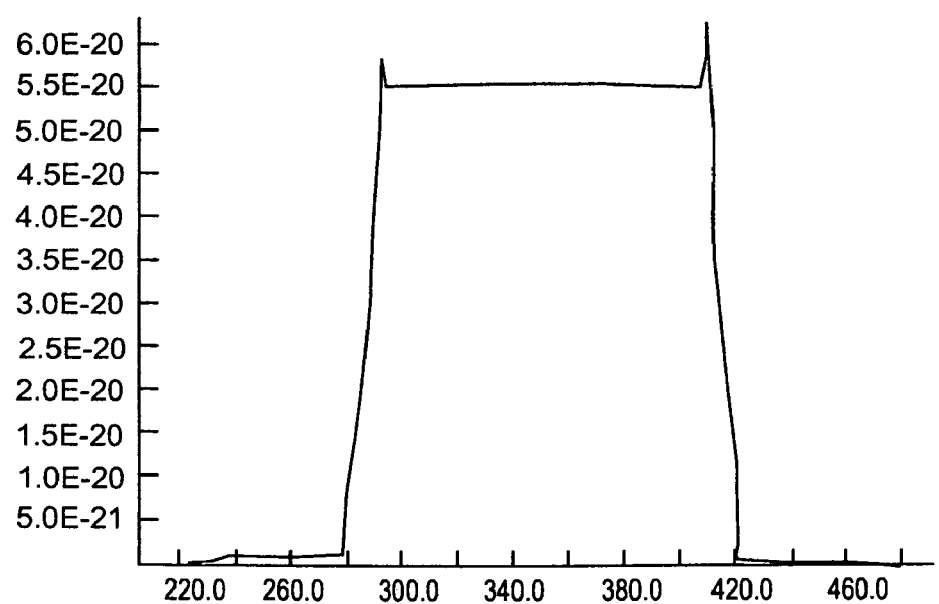

FIGS. 12A through 12C are views of the result of a simulation performed on electron beam emission in the FED of FIG. 10. This simulation is performed under the following conditions. A voltage of 3000V is supplied to an anode electrode, a voltage of 0V is supplied to a gate electrode, a voltage of −20V is supplied to a cathode electrode, and a voltage of −20V is supplied to a focusing electrode, as described above. Specifically, FIG. 12A illustrates the trajectories of electron beams emitted from an emitter, FIG. 12B is an expanded view of the peripheries of the emitter, and FIG. 12C illustrates current density.

Referring to FIGS. 12A through 12C, it has been found that the width of electron beams that reach a fluorescent layer is about 200-300 μm, the focusing effect of electron beams is improved and the FED can be driven at a low driving voltage, as described above.

A method of manufacturing an FED according to the present invention is described below with reference to the accompanying drawings.

Figure 13A:
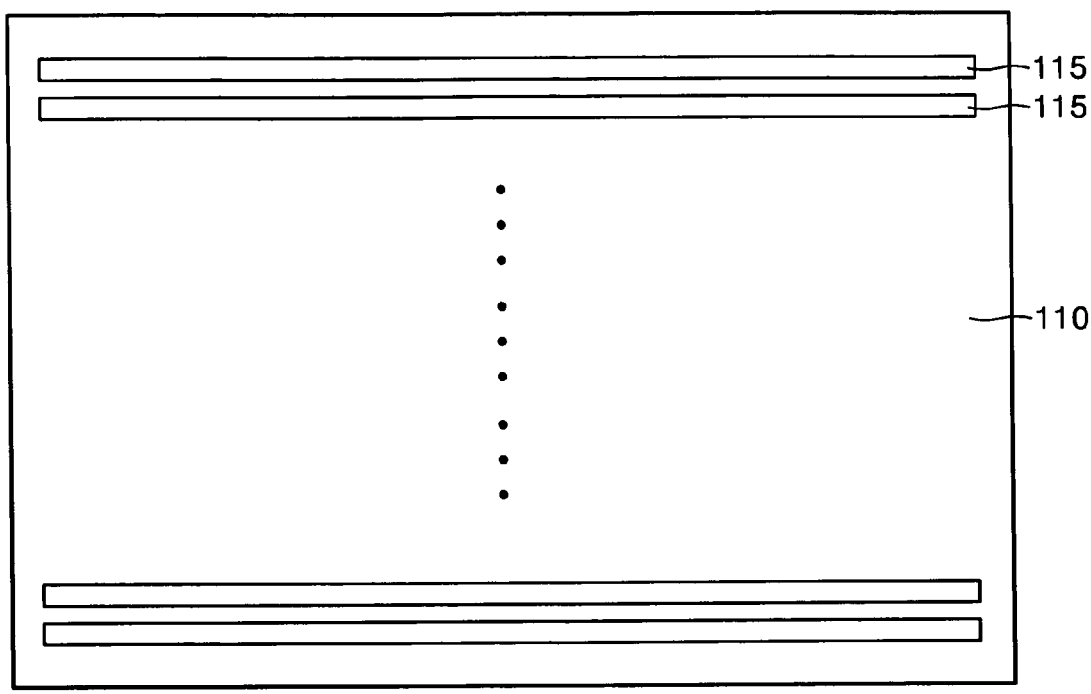
FIGS. 13A through 19 are views of a method of manufacturing the FED of FIG. 4.
Figure 13B:
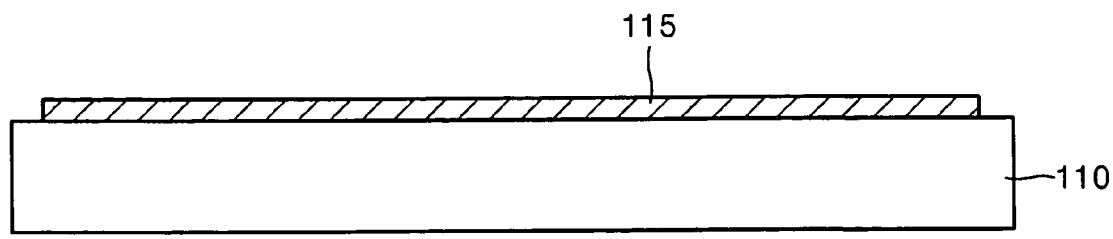

FIGS. 13A through 19 are views of a method of manufacturing the FED of FIG. 4. First, as shown in FIGS. 13A and 13B, a plurality of under-gate electrodes 115 are formed parallel to one another on the top surface of a lower substrate 110 in a striped shape. A glass substrate is generally used as the lower substrate 110, and the under-gate electrodes 115 can be formed by coating a transparent conductive material such as Indium Tin Oxide (ITO) on the top surface of the lower substrate 110 and by patterning the conductive material.

Figure 14A:
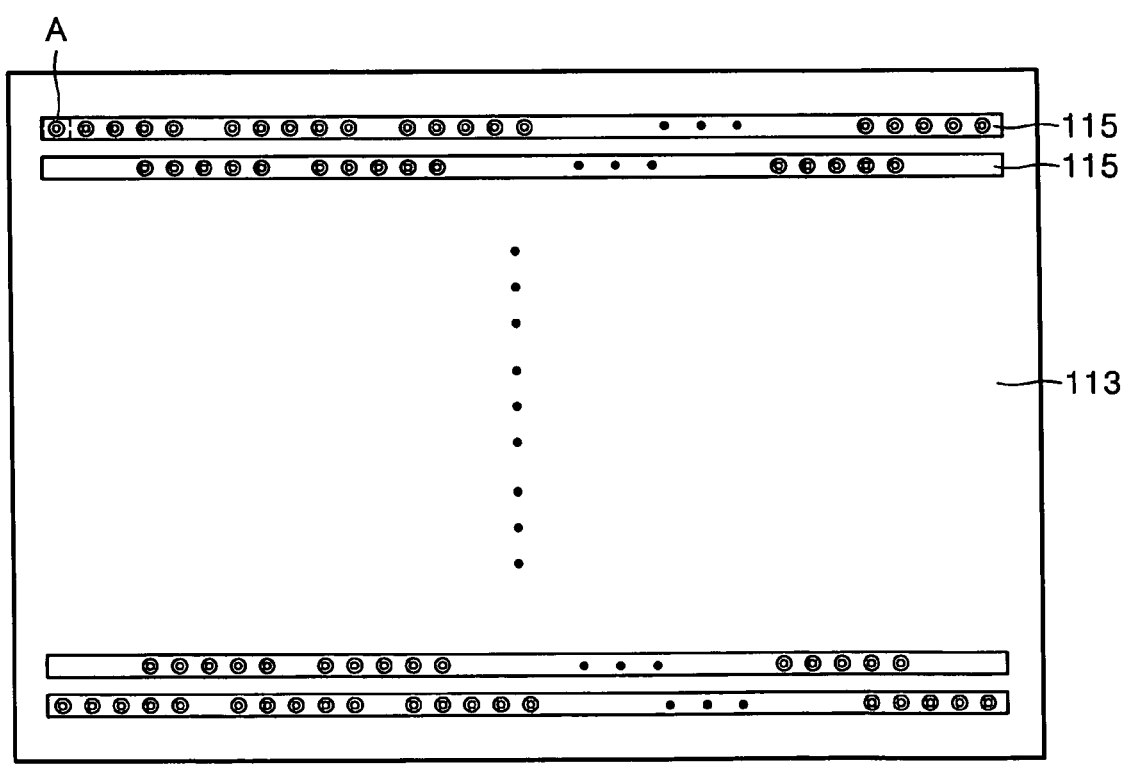
Figure 14B:
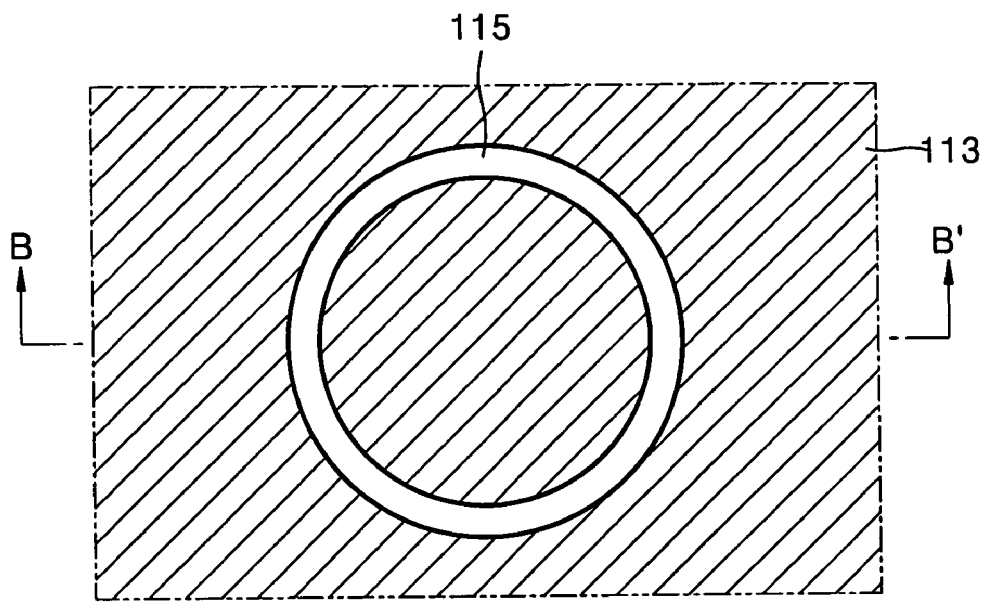
Figure 14C:
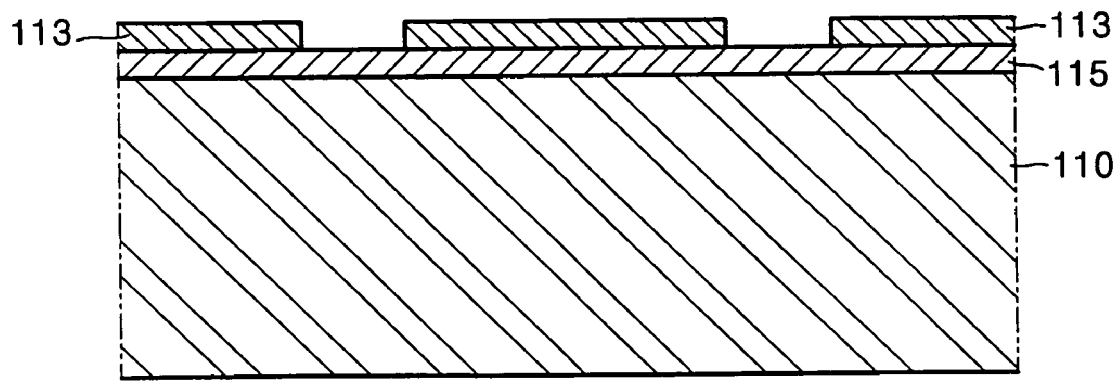

Next, as shown in FIG. 14A, a mask layer 113 for backward exposure is formed on the top surface of the lower substrate 110 to cover the under-gate electrodes 115. FIG. 14B is an enlarged view of a portion A of FIG. 14A, and FIG. 14C is a cross-sectional view of a unit structure taken along a line B-B' of FIG. 14B.

Only the cross-section of a unit structure of the FED will now be described with reference to the following drawings.

The mask layer 113 for backward exposure can be formed of amorphous silicon (a-Si) or a metallic thin film on the top surface of the lower substrate 110 and by patterning the a-Si or metallic thin film. The mask layer 113 for backward exposure serves as a photo-mask for forming emitters (130 of FIG. 19) through a photolithography process using backward exposure and a resistive layer in a process that will be described later. Thus, the mask layer 113 for backward exposure is patterned in a shape corresponding to the emitters (130 of FIG. 9). By forming the emitters (130 of FIG. 19) through the photolithography process using a forward exposure, the above-described operation of forming the mask layer 113 for backward exposure can be omitted.

Figure 15:
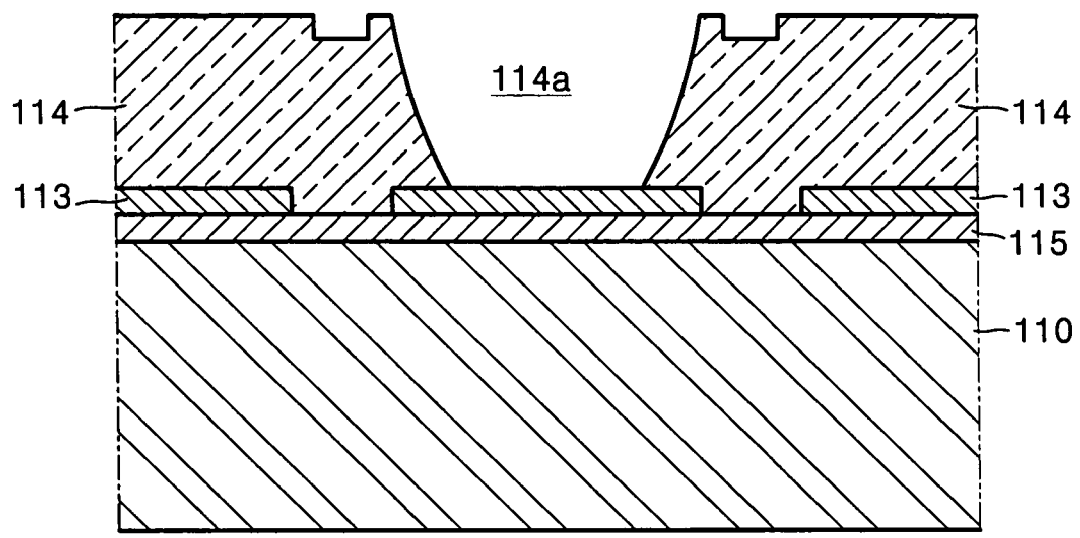

Subsequently, as shown in FIG. 15, a first insulating layer 114 in which first cavities 114a are formed, is formed on the top surface of the mask layer 113 for backward exposure. The first insulating layer 114 can be formed by coating a predetermined insulating material on the top surface of the mask layer 113 for backward exposure, by patterning the insulating material, and by forming the first cavities 114a through which a portion of the mask layer 113 for backward exposure is exposed.

Figure 16:
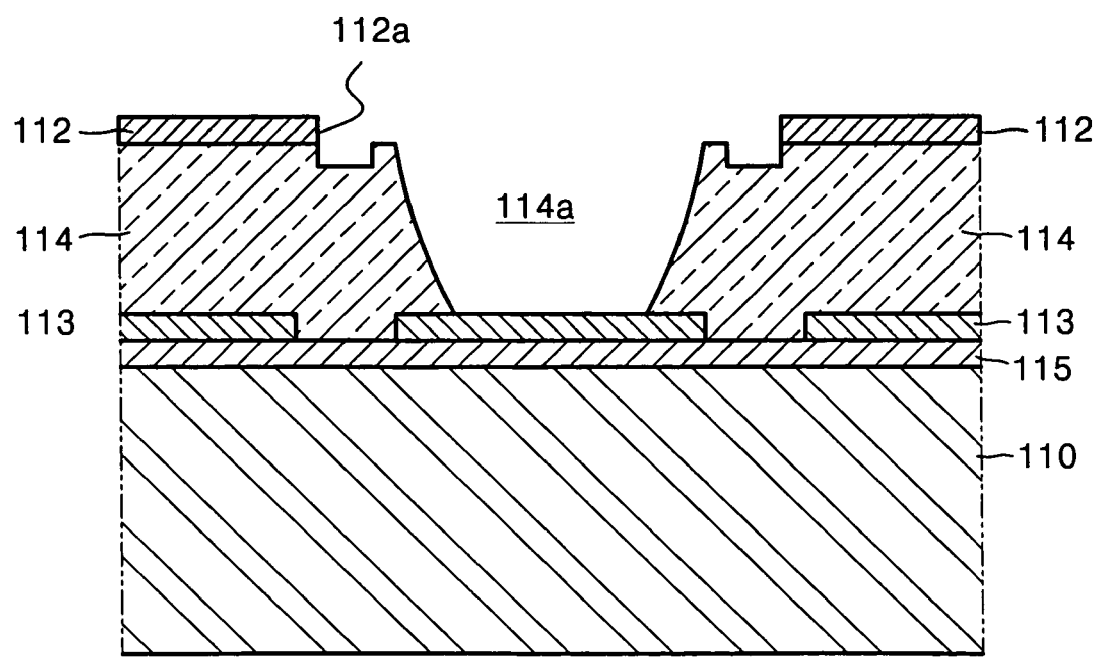

As shown in FIG. 16, a plurality of cathode electrodes 112 are formed perpendicular to the under-gate electrodes 115 on the top surface of the first insulating layer 114. In this case, each of cathode holes 112a which communicate with the first cavities 114a, is formed in each of the cathode electrodes 112 that intersect with the under-gate electrodes 1115. The cathode electrodes 112 can be formed by coating a conductive metallic material or transparent conductive material such as ITO, on the entire surface of a resultant of FIG. 15 and by patterning the material.

Figure 17:
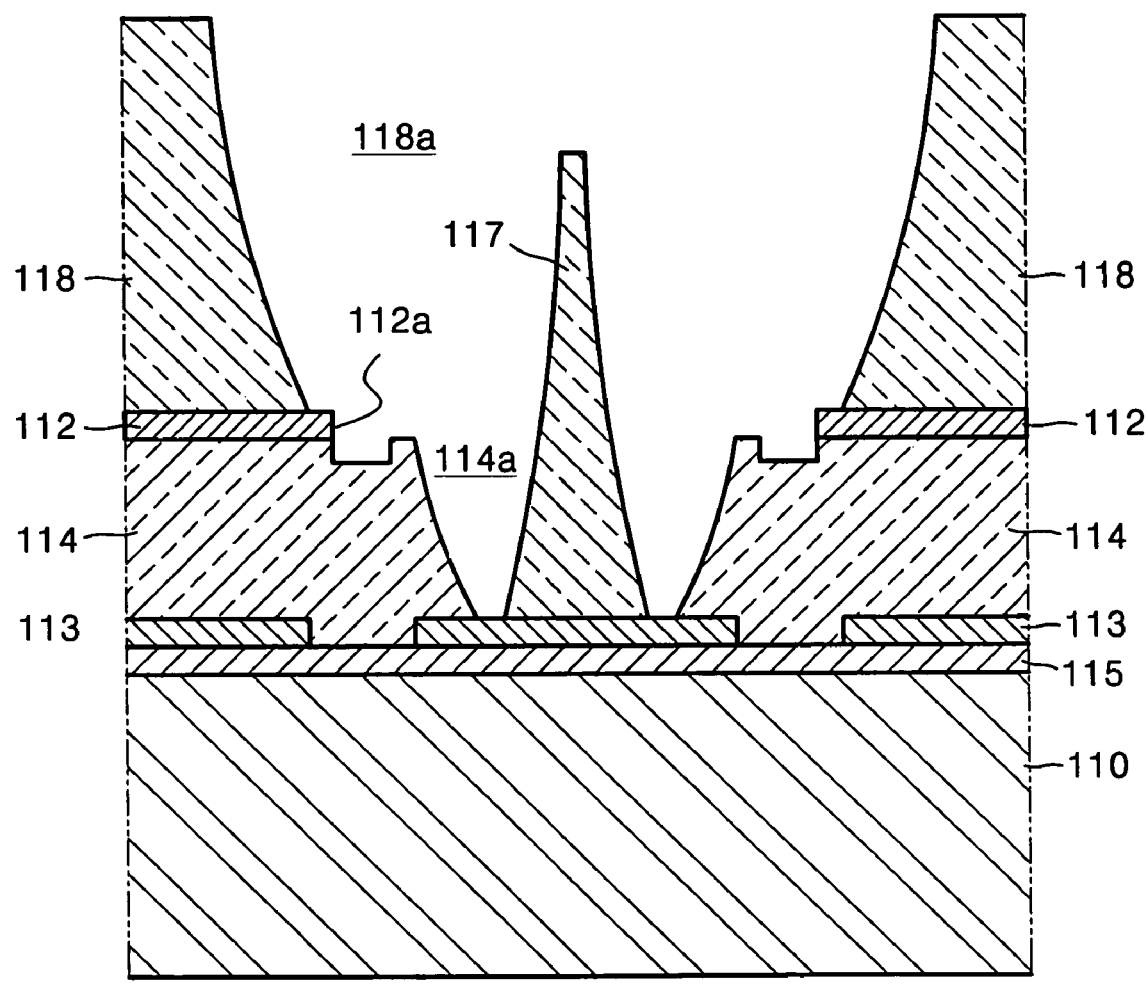

Subsequently, as shown in FIG. 17, a second insulating layer 118 in which second cavities 118a which communicate with the cathode holes 112a are formed, and protrusions 117 that protrude from a bottom central portion of each first cavity 114a are formed on top surfaces of the cathode electrodes 112a. The protrusions 117 are placed in a central portion of each cathode hole 112a. The second insulating layer 118 and the protrusions 117 can be formed by coating a predetermined insulating material on the entire surface of a resultant of FIG. 16 and by patterning the insulating material. As such, the protrusions 117 are formed at the same height as the thickness of the second insulating layer 118. The second insulating layer 118 and the protrusions 117 can be sequentially formed.

Figure 18:
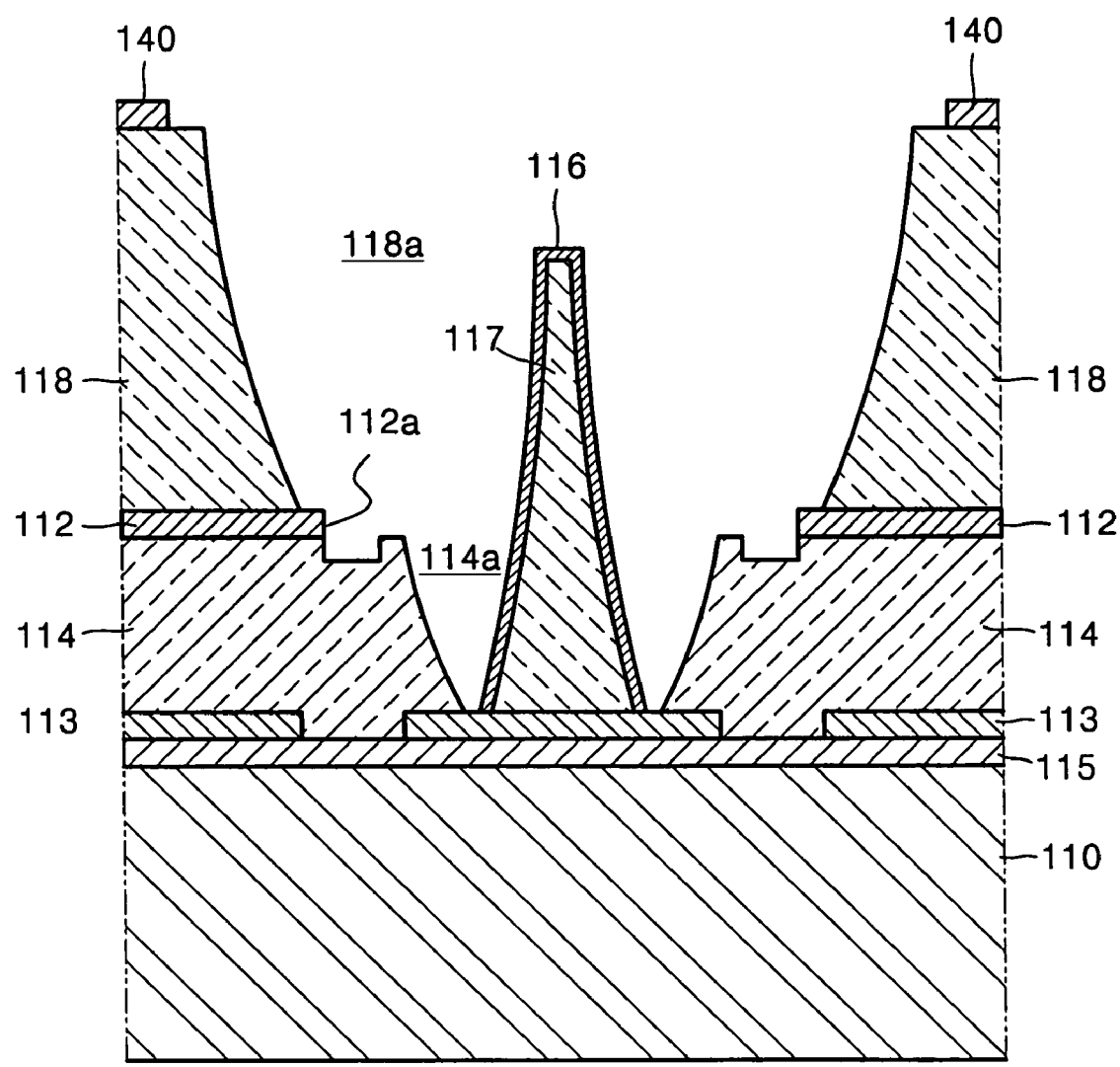

As shown in FIG. 18, a focusing electrode 140 is formed on the top surface of the second insulating layer 118, and gate electrodes 116 are formed on external surfaces of the protrusions 117. The focusing electrode 140 and the gate electrodes 116 can be simultaneously formed by coating a conductive material or transparent conductive material such as ITO on the entire surface of a resultant of FIG. 17 and by patterning the material. The focusing electrode 140 and the gate electrodes 116 can be sequentially formed.

Figure 19:
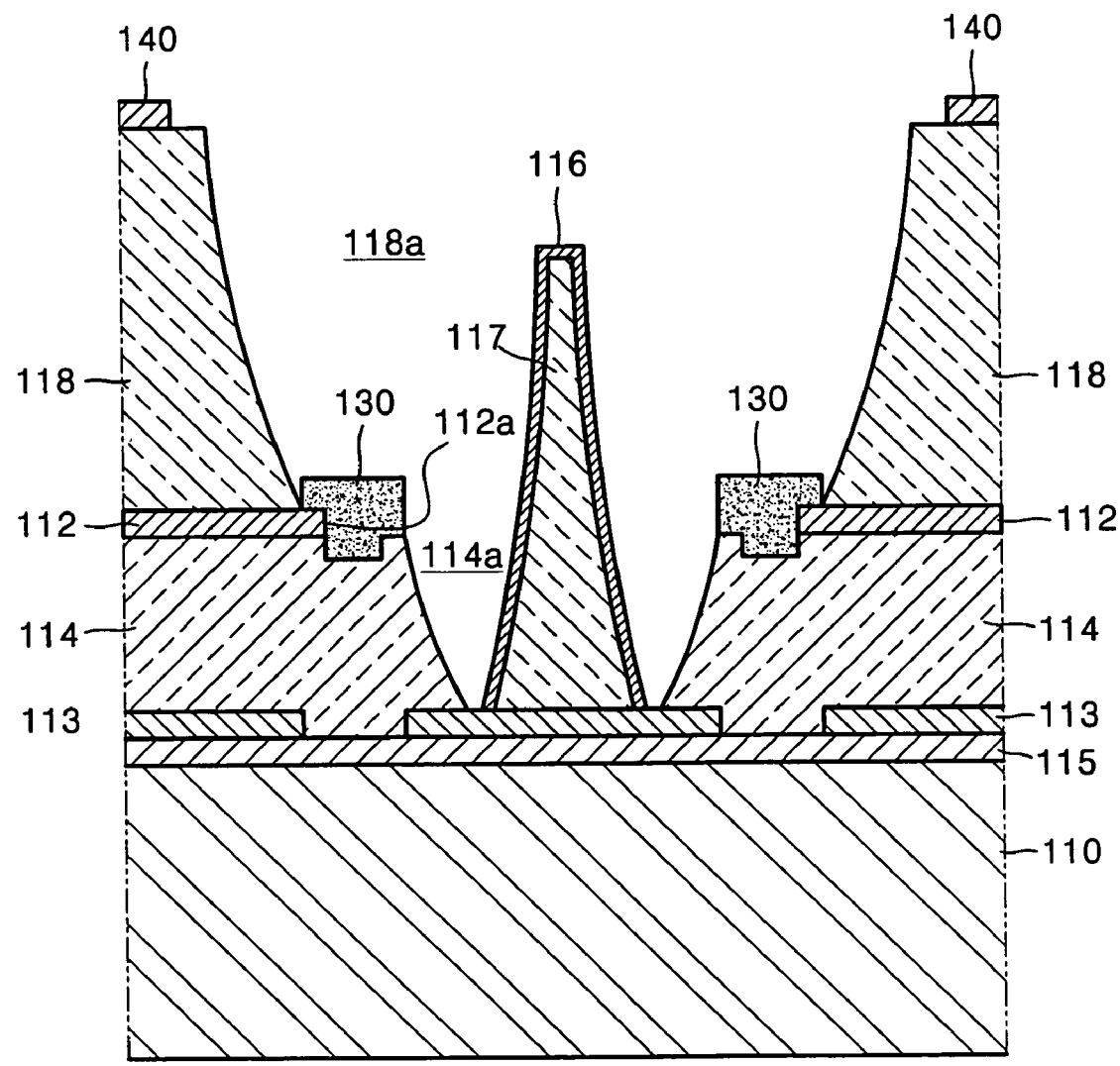

As shown in FIG. 19, a plurality of emitters 130 are formed in a ring shape along insides of the cathode holes 112a. Each of the emitters 130 is symmetrical with respect to the center of each cathode hole 112a. The emitters 130 can be formed by coating a predetermined electron emission material on the entire surface of a resultant of FIG. 18 and by patterning the electron emission material through a photolithography process using backward exposure by using the mask layer 113 for backward exposure as a photo-mask. The electron emission material can be at least one material selected from the group consisting of Carbon Nano-Tubes (CNTs), amorphous carbon, nano-diamonds, nano-metallic lines, and nano-oxidation metallic lines. The emitters 130 can be formed by a photolithography process using a forward exposure. In this case, the mask layer 113 for backward exposure is not required. The emitters 130 can have a variety of shapes in which each emitter 130 is symmetrical with respect to the center of each cathode hole 112a.

Last, an upper substrate (120 of FIG. 2) on which an anode electrode (122 of FIG. 2) and fluorescent layers (124 of FIG. 2) are formed are combined with a resultant of FIG. 19 to complete the FED.

FIGS. 20 through 24 are views of a method of manufacturing the FED of FIG. 9.

Figure 20:
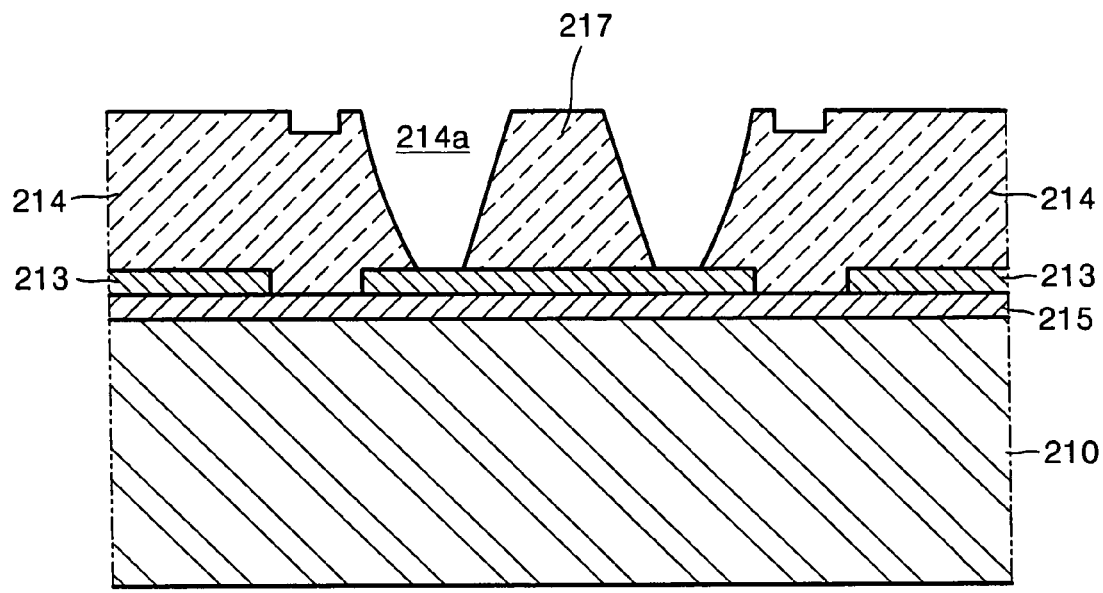
FIGS. 20 through 24 are views of a method of manufacturing the FED of FIG. 9.

As shown in FIG. 20, a first insulating layer 214 in which first cavities 214a are formed, and protrusions 217 that protrude from bottom central portions of the first cavities 214a are formed on the top surface of a mask layer 213 for backward exposure. A process of forming a plurality of under-gate electrodes 215 on the top surface of a lower substrate 210 and forming the mask layer 213 for backward exposure on top surfaces of the under-gate electrodes 215 is the same as the process of FIGS. 13A through 14C, and accordingly, detailed descriptions thereof have been omitted. The first insulating layer 214 and the protrusions 217 can be simultaneously formed by coating a predetermined insulating material on the top surface of the mask layer 213 for backward exposure and by patterning the insulating material. As such, the protrusions 217 are formed at the same height as the thickness of the first insulating layer 214. The first insulating layer 214 and the protrusions 217 can be sequentially formed.

Figure 21:
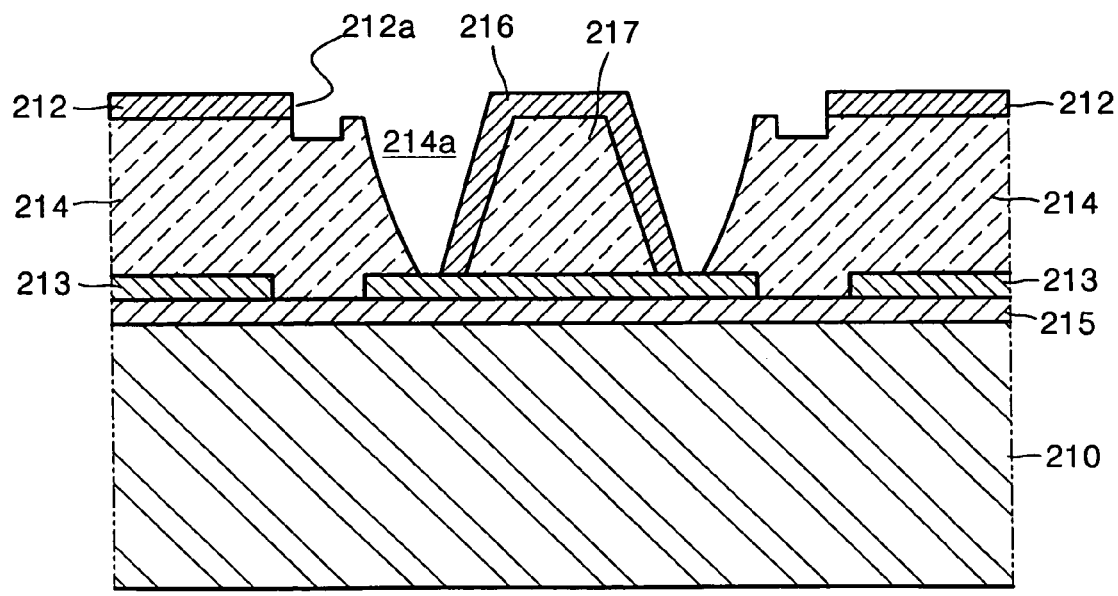

As shown in FIG. 21, a plurality of cathode electrodes 212 are formed perpendicular to the under-gate electrodes 215 on the top surface of the first insulating layer 214. Gate electrodes 216 are formed on external surfaces of the protrusions 217. Each of cathode holes 212a which communicate with the first cavities 214a, is formed in each of the cathode electrodes 212 that intersect with the under-gate electrodes 215. The cathode electrodes 212 and the gate electrodes 216 can be simultaneously formed by coating a conductive metallic material or transparent conductive material such as ITO on the entire surface of a resultant of FIG. 20 and by patterning the material. The cathode electrodes 212 and the gate electrodes 216 can be sequentially formed.

Figure 22:
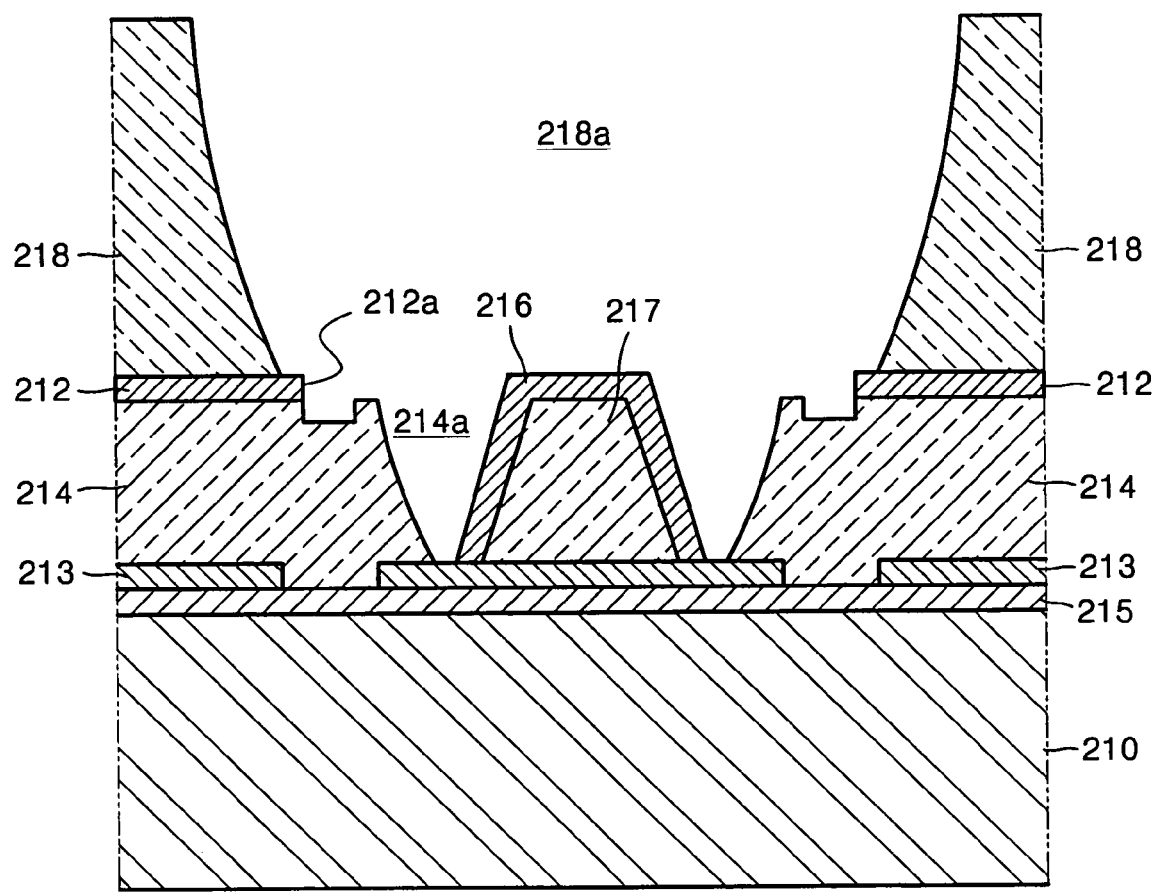

As shown in FIG. 22, a second insulating layer 218, having second cavities 218a communicating with the cathode holes 212a, is formed on top surfaces of the cathode electrodes 212. The second insulating layer 218 can be formed by coating a predetermined insulating material on the entire surface of a resultant of FIG. 21 and by patterning the insulating material.

Figure 23:
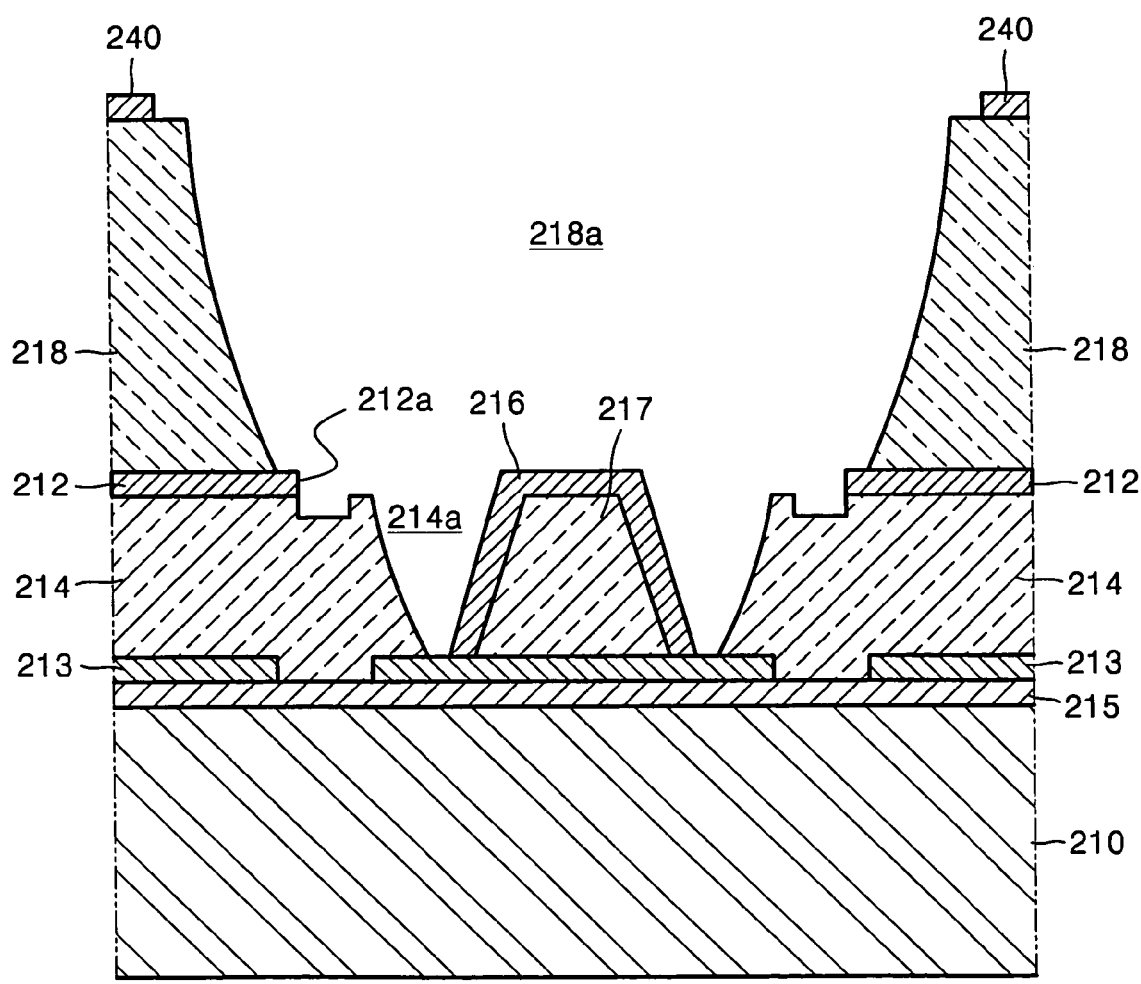

As shown in FIG. 23, a focusing electrode 240 is formed on the top surface of the second insulating layer 218. The focusing electrode 240 can be formed by coating a conductive metallic material or transparent conductive material such as ITO on the entire surface of a resultant of FIG. 22 and by patterning the material.

Figure 24:
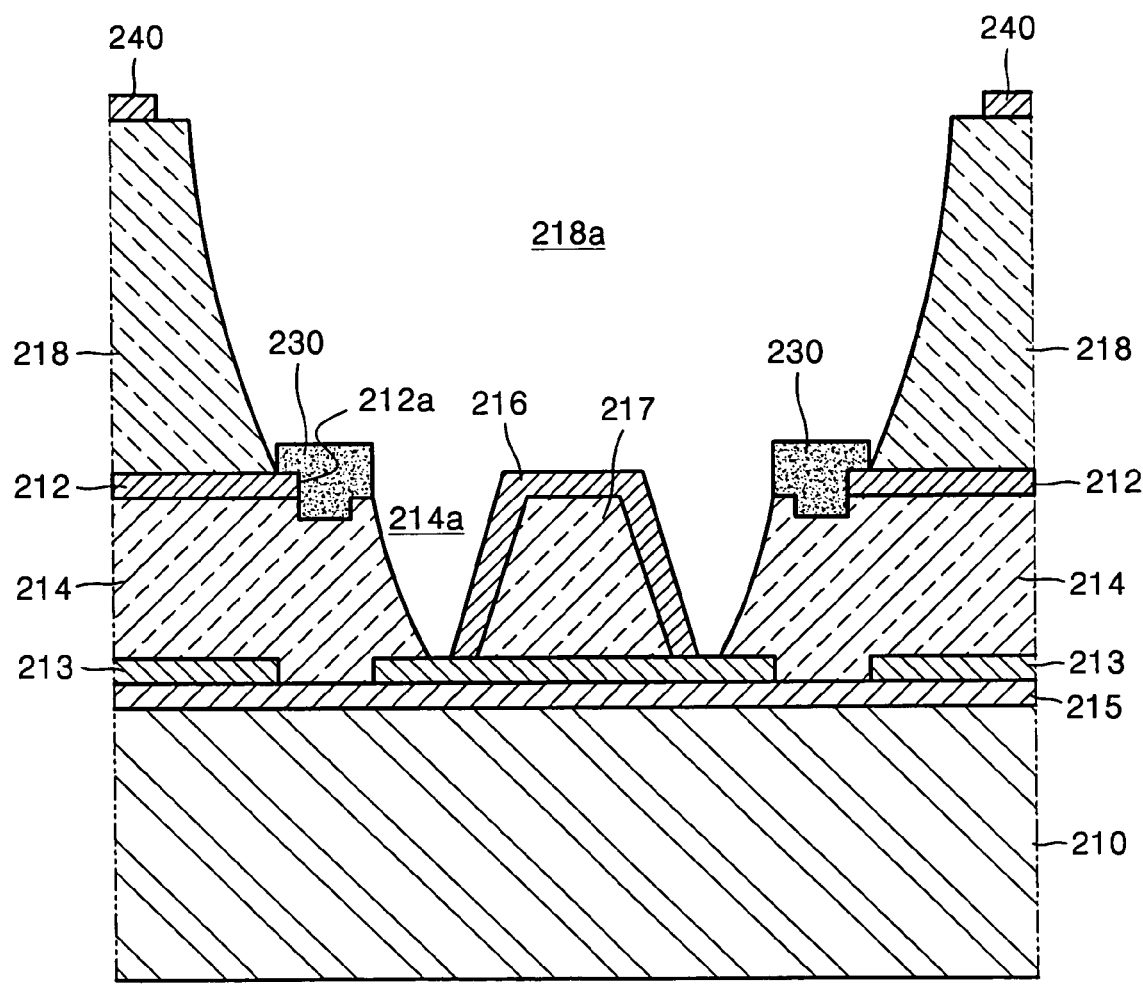

As shown in FIG. 24, a plurality of emitters 230 are formed in a ring shape along insides of the cathode holes 212a. Thus, each of the emitters 230 is symmetrical with respect to the center of each cathode hole 212a. The emitters 230 can be formed by coating a predetermined electron emission material on the entire surface of a resultant of FIG. 23 and by patterning the electron emission material through a photolithography process using backward exposure by using the mask layer 213 for backward exposure as a photo-mask. The electron emission material can be at least one material selected from the group consisting of Carbon Nano-Tubes (CNTs), amorphous carbon, nano-diamonds, nano-metallic lines, and nano-oxidation metallic lines. The emitters 230 can be formed by a photolithography process using a forward exposure. In this case, the mask layer 213 for backward exposure is not required. The emitters 230 can have a variety of shapes in which each emitter 230 is symmetrical with respect to the center of each cathode hole 212a.

An upper substrate (120 of FIG. 2) on which an anode electrode (122 of FIG. 2) and fluorescent layers (124 of FIG. 2) are formed are combined with a resultant of FIG. 24 to complete the FED.

FIGS. 25 through 29 are views of a method of manufacturing the FED of FIG. 10.

Figure 25:
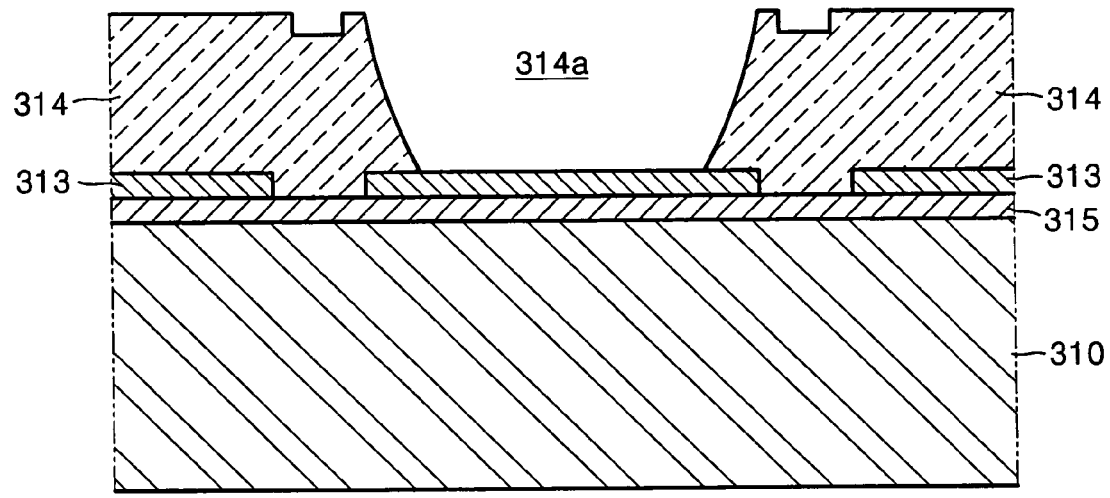
FIGS. 25 through 29 are views of a method of manufacturing the FED of FIG. 10.

As shown in FIG. 25, a first insulating layer 314, having first cavities 314a, is formed on the top surface of a mask layer 313 for backward exposure. A process of forming a plurality of under-gate electrodes 315 on the top surface of a lower substrate 310 and forming the mask layer 313 for backward exposure on top surfaces of the under-gate electrodes 315 is the same as the process of FIGS. 13A through 14C, and accordingly, a detailed descriptions thereof has been omitted. The first insulating layer 314 can be formed by coating a predetermined insulating material on the top surface of the mask layer 313 for backward exposure and by patterning the insulating material.

Figure 26:
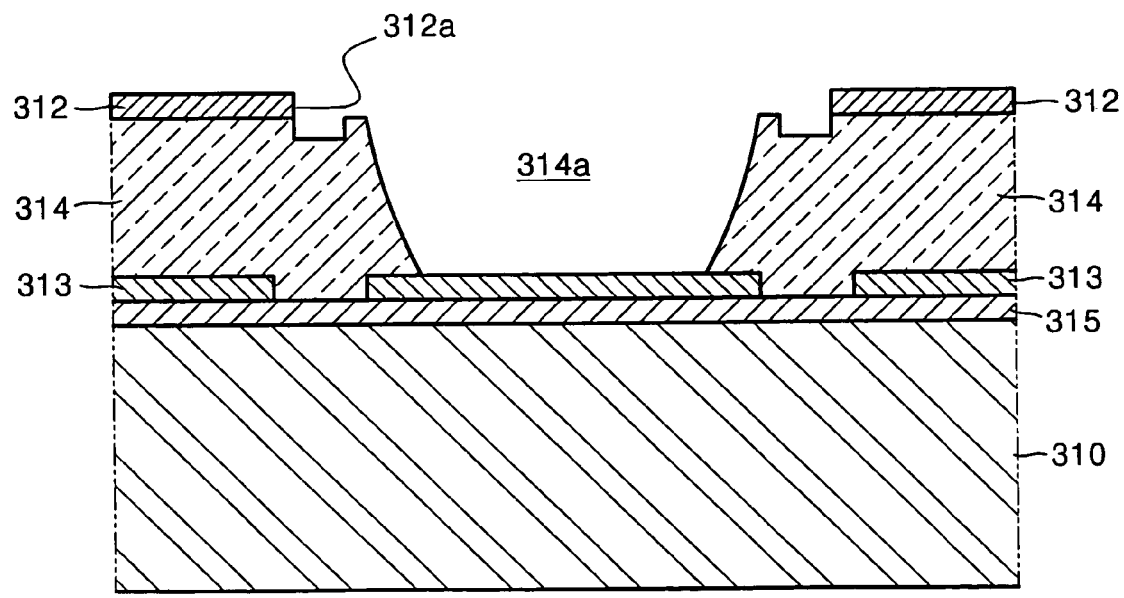

As shown in FIG. 26, a plurality of cathode electrodes 312 are formed perpendicular to the under-gate electrodes 315 on the top surface of the first insulating layer 314. Each of cathode holes 312a which communicate with the first cavities 314a, is formed in each of the cathode electrodes 312 that intersect with the under-gate electrodes 315. The cathode electrodes 312 can be formed by coating a conductive metallic material or transparent conductive material such as ITO on the entire surface of a resultant of FIG. 25 and by patterning the material.

Figure 27:
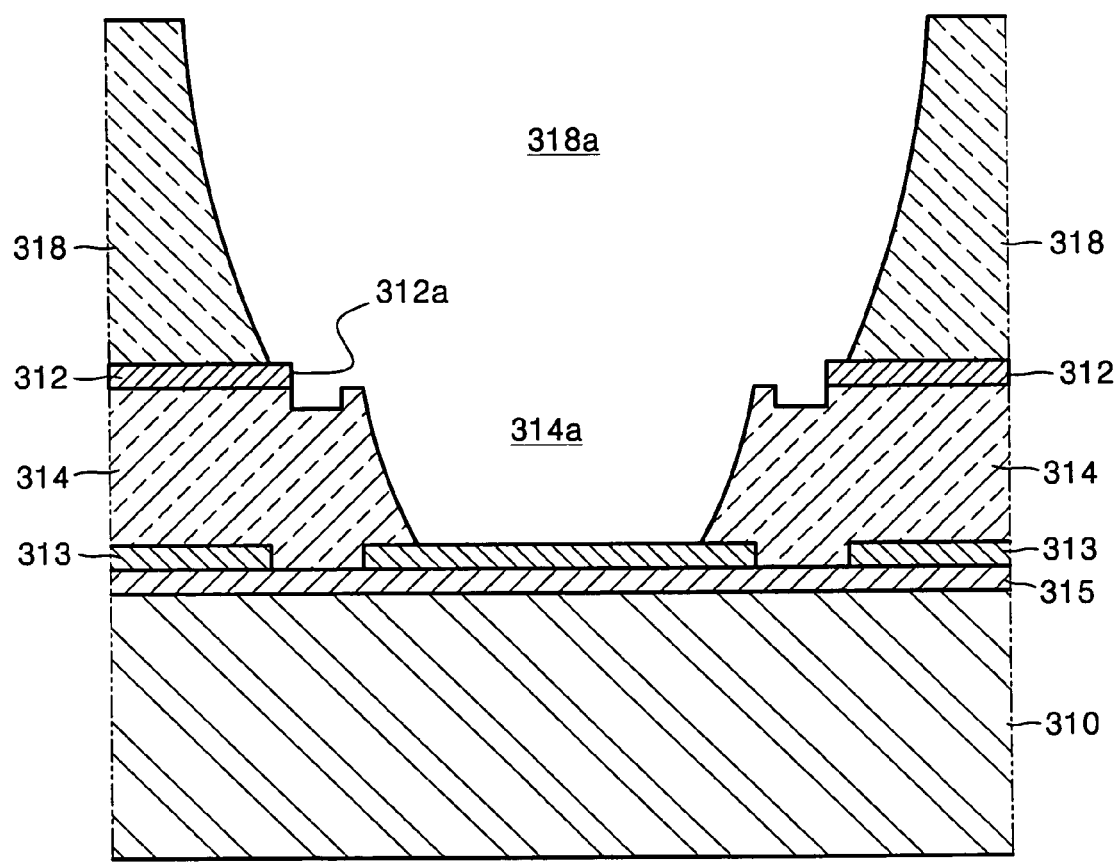

As shown in FIG. 27, a second insulating layer 318, having second cavities 318a communicating with the cathode holes 312a, is formed on top surfaces of the cathode electrodes 312. The second insulating layer 318 can be formed by coating a predetermined insulating material on the entire surface of a resultant of FIG. 26 and by patterning the insulating material.

Figure 28:
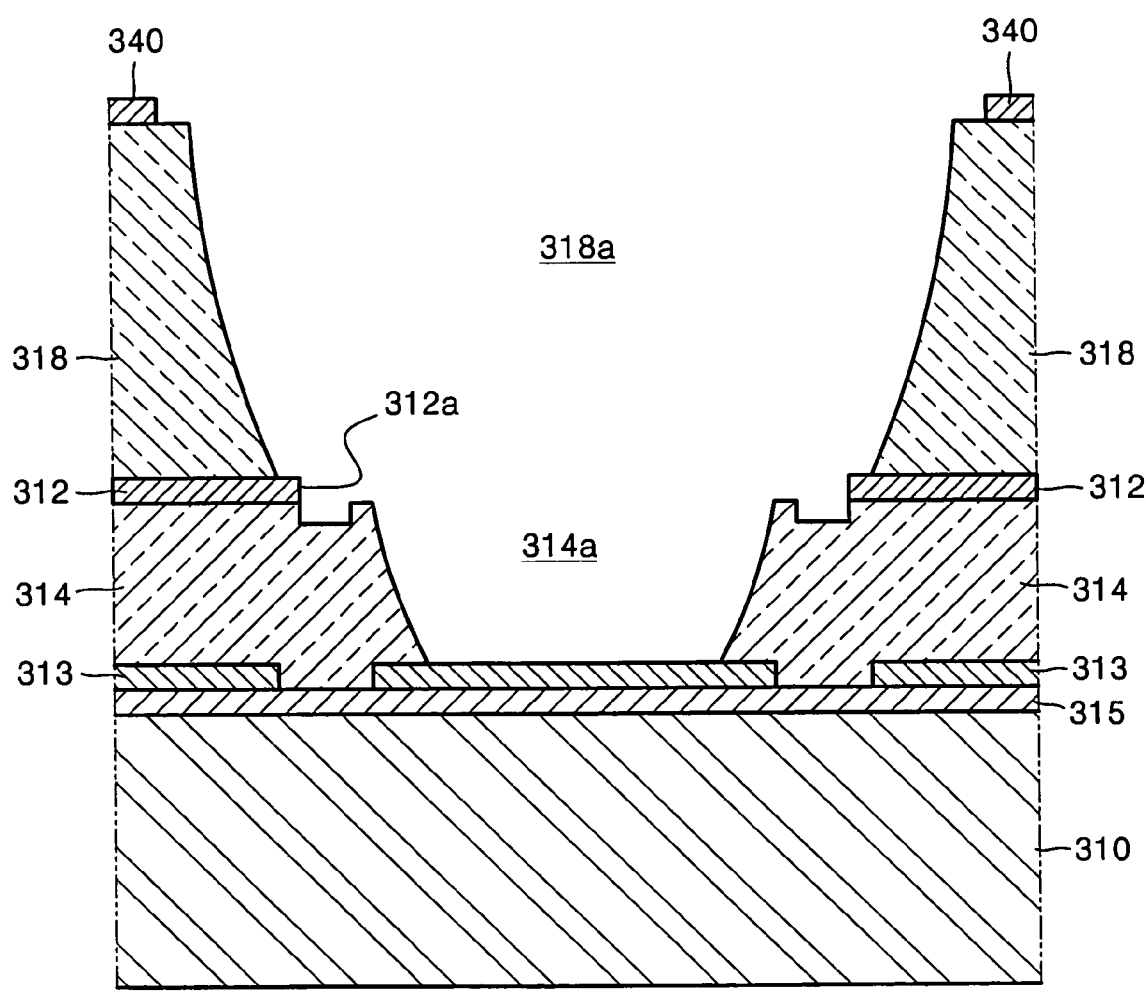

As shown in FIG. 28, a focusing electrode 340 is formed on the top surface of the second insulating layer 318. The focusing electrode 340 can be formed by coating a conductive metallic material or transparent conductive material such as ITO on the entire surface of a resultant of FIG. 27 and by patterning the material.

Figure 29:
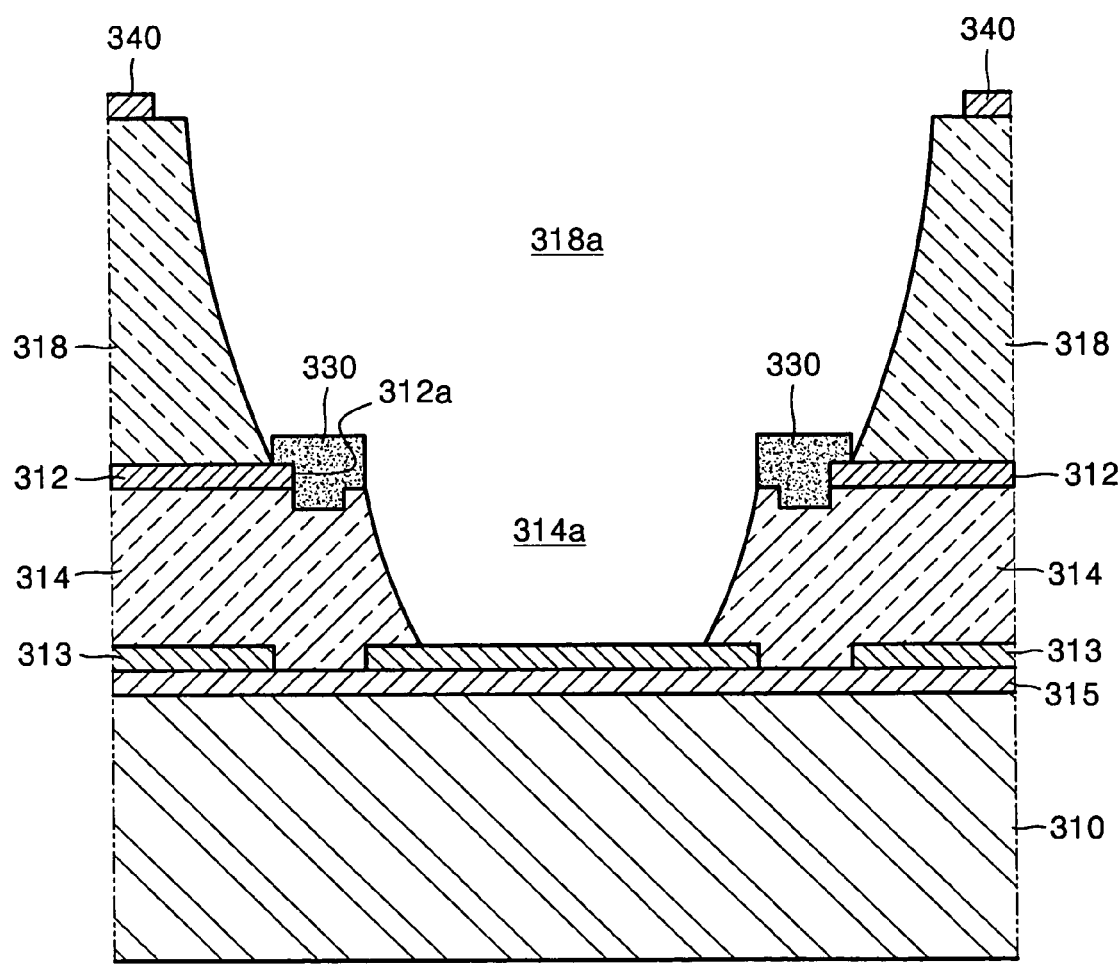

As shown in FIG. 29, a plurality of emitters 330 are formed in a ring shape along insides of the cathode holes 312a. Each of the emitters 330 is symmetrical with respect to the center of each cathode hole 312a. The emitters 330 can be formed by coating a predetermined electron emission material on the entire surface of a resultant of FIG. 28 and by patterning the electron emission material through a photolithography process using backward exposure by using the mask layer 313 for backward exposure as a photo-mask. The electron emission material can be at least one material selected from the group consisting of Carbon Nano-Tubes (CNTs), amorphous carbon, nano-diamonds, nano-metallic lines, and nano-oxidation metallic lines. The emitters 330 can be formed by a photolithography process using a forward exposure. In this case, the mask layer 313 for backward exposure is not required. The emitters 330 can have a variety of shapes in which each emitter 330 is symmetrical with respect to the center of each cathode hole 312a.

An upper substrate (120 of FIG. 2) on which an anode electrode (122 of FIG. 2) and fluorescent layers (124 of FIG. 2) are formed are combined with a resultant of FIG. 29 to complete the FED.

As described above, the FED and the method of manufacturing the FED according to the present invention have the following effects.

The emitter structure is improved such that the area of electron emission of the emitter is increased and a luminance efficiency is improved. In addition, the focusing effect of the electron beams can be improved, and a driving voltage can be reduced. Furthermore, a process of manufacturing the FED according to the present invention is compatible with a conventional processes of manufacturing the FED such that the occurrence of additional costs are avoided.

While the present invention has been particularly shown and described with reference to exemplary embodiments thereof, it will be understood by those skilled in the art that various modifications in form and detail can be made therein without departing from the spirit and scope thereof as defined by the appended claims.

What is claimed is:

1. A Field Emission Display (FED) comprising:
 a substrate;
 a plurality of under-gate electrodes arranged parallel to one another on a top surface of the substrate;
 a plurality of cathode electrodes arranged perpendicular to the under-gate electrodes on an upper portion of the under-gate electrodes, the plurality of cathode electrodes having cathode holes arranged in portions of the cathode electrodes that intersect with the under-gate electrodes;
 a plurality of emitters arranged symmetrically with respect to centers of the cathode holes on the cathode electrodes; and
 a plurality of gate electrodes electrically connected to the under-gate electrodes in central portions of the cathode holes.

2. The FED of claim 1, wherein the emitters comprise a ring shape along peripheries of the cathode holes.

3. The FED of claim 1, wherein the emitters comprise at least one material selected from the group consisting of Carbon Nano-Tubes (CNTs), amorphous carbon, nano-diamonds, nano-metallic lines, and nano-oxidation metallic lines.

4. The FED of claim 1, further comprising:
 a first insulating layer arranged between the under-gate electrodes and the cathode electrodes: and
 first cavities arranged in the first insulating layer and communicating with the cathode holes.

5. The FED of claim 4, further comprising:
 a second insulating layer arranged on top surfaces of the cathode electrodes; and
 second cavities arranged in the second insulating layer and communicating with the cathode holes.

6. The FED of claim 5, further comprising a focusing electrode arranged on a top surface of the second insulating layer.

7. The FED of claim 6, wherein the gate electrodes protrude from bottom central portions of the first cavities.

8. The FED of claim 7, further comprising protrusions of an insulating material arranged in the gate electrodes.

9. The FED of claim 7, wherein a top portion of each of the gate electrodes is at the same height as the height of the cathode electrodes.

10. The FED of claim 7, wherein a top portion of each of the gate electrodes is at a height between that of the cathode electrodes and that of the focusing electrode.

11. The FED of 1, further comprising a mask layer for backward exposure arranged on top surfaces of the under-gate electrodes.

12. The FED of claim 11, wherein the mask layer for backward exposure comprises an amorphous silicon or a metallic thin film.

13. The FED of claim 1, wherein the under-gate electrodes comprise transparent electrodes.

14. A Field Emission Display (FED) comprising:
 a substrate;
 a plurality of under-gate electrodes arranged parallel to one another on a top surface of the substrate;
 a plurality of cathode electrodes arranged perpendicular to the under-gate electrodes on an upper portion of the under-gate electrodes, the plurality of cathode electrodes having cathode holes arranged in portions of the cathode electrodes that intersect with the under-gate electrodes; and a plurality of emitters arranged symmetrically with respect to centers of the cathode holes on the cathode electrodes.

15. The FED of claim 14, wherein the emitters comprise a ring shape along peripheries of the cathode holes.

16. The FED of claim 14, wherein the emitters comprise at least one material selected from the group consisting of Carbon Nano-Tubes (CNTs), amorphous carbon, nano-diamonds, nano-metallic lines, and nano-oxidation metallic lines.

17. The FED of claim 14, further comprising:

a first insulating layer arranged between the under-gate electrodes and the cathode electrodes; and first cavities communicating with the cathode holes and arranged in the first insulating layer.

18. The FED of claim 17, further comprising:

a second insulating layer arranged on top surfaces of the cathode electrodes; and second cavities communicating with the cathode holes and arranged in the second insulating layer.

19. The FED of claim 18, further comprising a focusing electrode arranged on a top surface of the second insulating layer.

20. The FED of claim 14, further comprising a mask layer for backward exposure arranged on top surfaces of the under-gate electrodes.

21. The FED of claim 20, wherein the mask layer for backward exposure comprises amorphous silicon or a metallic thin film.

22. The FED of claim 14, wherein the under-gate electrodes comprise transparent electrodes.

23. A Field Emission Display (FED) comprising:

a lower substrate and an upper substrate arranged opposite to each other at a distance;

a plurality of under-gate electrodes arranged parallel to one another on a top surface of the lower substrate;

a plurality of cathode electrodes arranged perpendicular to the under-gate electrodes on an upper portion of the under-gate electrodes, the plurality of cathode electrodes having cathode holes arranged in portions of the cathode electrodes that intersect with the under-gate electrodes;

an electron emission source having a plurality of emitters arranged symmetrically with respect to centers of the cathode holes on the cathode electrodes;

an anode cathode arranged on a bottom surface of the upper substrate; and a fluorescent layer arranged on a bottom surface of the anode electrode;

wherein the electron emission source includes a plurality of emitter arrays, each emitter array including at least one emitter and corresponding to each of sub-pixels of a pixel; and wherein adjacent emitter arrays cross one another.

24. The FED of claim 23, wherein the fluorescent layer comprises a plurality of sub-pixel areas corresponding to the emitter arrays and wherein the adjacent sub-pixel areas cross one another.

25. The FED of claim 23, wherein the emitters comprise a ring shape along peripheries of the cathode holes.

26. The FED of claim 23, further comprising a focusing electrode arranged on the cathode electrodes.

27. The FED of claim 26, further comprising a plurality of gate electrodes electrically connected to the under-gate electrodes, the plurality of gate electrodes being arranged in central portions of the cathode holes.

* * * * *